United States Patent
Paulus et al.

(10) Patent No.: US 7,246,137 B2
(45) Date of Patent: Jul. 17, 2007

(54) COLLABORATIVE AUDIT FRAMEWORK

(75) Inventors: Sachar Paulus, Weinheim (DE); Tom Schroer, Walldorf (DE); Cristina Buchholz, Walldorf (DE)

(73) Assignee: SAP Aktiengesellschaft (DE)

( * ) Notice: Subject to any disclaimer, the term of this patent is extended or adjusted under 35 U.S.C. 154(b) by 601 days.

(21) Appl. No.: 10/372,031

(22) Filed: Feb. 21, 2003

(65) Prior Publication Data
US 2004/0006585 A1   Jan. 8, 2004

Related U.S. Application Data

(60) Provisional application No. 60/386,839, filed on Jun. 5, 2002.

(51) Int. Cl.
*G06F 17/30*   (2006.01)
(52) U.S. Cl. .................... 707/104.1; 707/1
(58) Field of Classification Search ............ 707/1–10, 707/100–104.1, 200–206; 709/246; 715/784; 726/22
See application file for complete search history.

(56) References Cited

U.S. PATENT DOCUMENTS 6,134,664 A * 10/2000 Walker .................. 726/22
6,480,860 B1 * 11/2002 Monday .................. 707/102
6,636,868 B1 * 10/2003 Bauer et al. ............. 707/104.1
6,753,889 B1 *  6/2004 Najmi ...................... 715/784
6,810,429 B1 * 10/2004 Walsh et al. ............. 709/246
6,826,553 B1 * 11/2004 DaCosta et al. ......... 707/1
7,051,046 B2 *  5/2006 Virag et al. .............. 707/104.1

* cited by examiner

*Primary Examiner*—Yicun Wu
(74) *Attorney, Agent, or Firm*—Fish & Richardson P.C.

(57) ABSTRACT

A framework for comprehensive auditing of applications involved in business processes in distributed application landscapes, including local, distributed and collaborative audit, is based on the concept of a collaborative "audit warehouse" that enables a central, tool-supported audit of cross-enterprise business processes. The interface for the audit data warehouse is defined in an intermediate format language with verification capabilities, such as XML (Extensible Markup Language). Applications in effect write audit data to audit data pools in the warehouse, e.g., in XML format transferred via http over the Internet. Alternatively, data is pulled from the applications by the warehouse automatically or on command. In one preferred paradigm individual enterprises have their own central audit data warehouses, each collecting data from applications both within and outside of the enterprise that owns the warehouse, in order to aggregate audit data for a given business process spanning potentially several distinct enterprises.

24 Claims, 20 Drawing Sheets

COLLABORATIVE AUDIT FRAMEWORK

CROSS-REFERENCE TO RELATED APPLICATIONS

This application claims priority to U.S. Application Ser. No. 60/386,839, filed on Jun. 5, 2002 by Sachar Paulus and Tom Schroeer, entitled "e-Business Security Architecture." The present application is also related to a companion application entitled "Authorization Mechanism," filed by Cristina Buchholz, (application Ser. No. 10/372,030, filed Feb. 21, 2003 on the same day as this application, which companion application in its entirety is incorporated by reference herein.

TECHNICAL FIELD

This invention relates generally to the information technology security and regulatory compliance field, and more particularly to audits of automated business processes.

BACKGROUND

Business processes need to be audited periodically for legal, contractual and security reasons. Certification and accreditation assure trust by participants and oversight agencies alike. Regular audit is essential to security to insure that policies, however well documented, are actually carried out. Auditing business processes involves checking for compliance with pre-established procedures as well as for proper authorization of the entities or people who executed or had access to the various elements of the process and then analyzing and recording the results of these inquiries in some meaningful way. If the entire business process is carried out on a single software application or an integrated set of distributed applications from a single source, i.e., a single software company, the audit process is reasonably straightforward because it can be done within the context of a consistent set of formats and procedures that are established and vouched for by the software producer. Audit software exists today both at the level of the individual application and also at the business system level of an integrated set of distributed applications from a single manufacturer, for example, SAP's "Audit Information System." However, business processes often span several applications from different manufacturers, each employing its own idiosyncratic procedures, nomenclature and formats. In this cross-application corporate landscape, performing a business process audit poses unique challenges that have not been met.

The problem is exacerbated where a given business process to be audited spans not only several different applications from different software providers but also multiple collaborating entities or enterprises, e.g., distinct but commonly-owned enterprises within a single corporate family environment, distinct noncommonly-owned corporations operating in a strategic alliance, partners in a joint venture or a supply chain including both suppliers and customers of a company with respect to a given product line. While these separate entities may all be involved in interrelated aspects of a single business process, e.g., a sales transaction, each entity may nonetheless constitute an independent regime from the security standpoint, e.g., having its own legacy controls and at least the potential capability of independent control, i.e. change, of the formats and procedures for its own information technology to suit its own perceived needs.

The only way in which cross-application business process audits can be carried out today in such an environment is to conduct audits of each application within each entity on an individual basis, taking into account the current respective set of applicable controls, procedures, formats, etc. and then to collect the necessary information for a particular business process from the various applications. An example of the collection approach is exemplified by Consul's eAudit" which is designed to collect and consolidate data from different sources. With existing tools, however, it is virtually impossible to trace and analyze cross-application business processes on systems provided by different manufacturers. Where the systems are operated by disparate enterprises within a single corporation or by different collaborating companies, it is even more difficult to coordinate and analyze the information from the individual audits in a way that warrants the trust of those who rely on the integrity of the business process as a whole.

Meanwhile, every day more and more business processes are moving to the Internet beyond the secure borders of in-house networks and intranets. As companies collaborate more frequently in e-business, open networks and cross-company business transactions are increasingly replacing monolithic, closed systems. Disparate applications maintained in different companies are being virtually extended beyond the secure confines of their respective in-house networks and combined to form efficient Web services. This type of collaboration obviously requires companies to exchange data beyond these secure environments. But by doing so, the collaborating enterprises surrender their unique control over the business process that enabled audit systems to thoroughly check the integrity of the system against established, well understood internal standards.

SUMMARY

The invention provides a framework for comprehensive auditing of applications and business processes in distributed application landscapes, including local, distributed and collaborative audit. The solution is based on the concept of a central or collaborative "audit warehouse" that performs a central, tool-supported audit of cross-enterprise business processes. One aspect of the invention is a unified set of standards for an audit data interface. Another aspect is identification of subprocess steps and the aggregation of audit documents for individual subprocess steps, which are carried out by different applications operated by different enterprises.

In one aspect of the invention, an auditing method for capturing audit data from various applications in a collaborative business process spanning more than one distinct enterprise, comprises establishing a central audit warehouse under either shared or third party control or under the control of one enterprise or of one group of interrelated enterprises, as a repository for audit data from the various applications both within the one enterprise or the one group of interrelated enterprises and also in distinct enterprises associated with a given business process. In this way audit data from applications associated with each other by way of a collaborative business process, e.g., supply chain, can all share data with a central warehouse despite the fact that the applications are running in distinct enterprises, not necessarily under common ownership or control.

The interface with the data warehouse can be defined in an intermediate format language with verification capabilities, such as XML (Extensible Markup Language).

Audit data is transferred to the warehouse from an application using a standardized format, preferably a compliant XML specification for audit data, via an interface to the first audit warehouse using a predefined communication protocol, e.g., http over the Internet. The received audit data is sorted and stored by the audit warehouse according to its association with the given business process or subprocess steps of a given business process so that audit data relating to the given business process can be retrieved together to check for compliance with required procedures.

In one paradigm instead of enterprises sharing a single common audit data warehouse, each enterprise has its own audit data warehouse which collects audit data from applications not only within the same enterprise (or group of interrelated enterprises, e.g., under common ownership) but also from distinct external enterprises via a preferably restricted interface to avoid compromising secure data.

In one preferred embodiment of the invention, audit data is extracted at the application level in a native format different from said standardized format and then converted to the corresponding standardized format for the type of audit data and transferred to a central audit warehouse. The receiving and processing o the audit data is accomplished via a collection interface for the central warehouse, e.g., including an XML processor. The transfer modalities are push and store whereby the applications themselves decide when to write data to a central audit data pool managed by the warehouse, pull and store whereby the warehouse dictates when data is to be actively collected from a given application or by an ad hoc inquiry, e.g., a request placed by an analyst during an audit of the business process.

The stored data in the warehouse can be accessed either by an internal interface, e.g., for periodic system checks and runtime alerts, or by an external interface manipulated by an audit analyzer. The audit warehouse can then provide the relevant data in response to online queries at the time of an audit. The internal interface can interact directly or indirectly with the enterprise applications, even remote ones, via a restricted interface.

A collaborative auditing framework, according to the invention, can be used to establish auditability within applications, and an integrated audit warehouse can be used to interface with an exchange infrastructure in a web services architecture as part of an overall electronic security architecture providing comprehensive, network-based security for collaborative e-business.

This comprehensive audit framework allows users to perform detailed checks on existing security mechanisms to ensure the ongoing integrity of business transactions and data. The security infrastructure can establish a collaborative framework for auditing distributed processes in a variety of scenarios. A distributed audit can be used to audit intra-enterprise processes, and a collaborative audit can be used to audit inter-enterprise collaborative processes.

The audit warehouse at the center of the collaborative audit framework can interface with a web application server, as well as portal and exchange infrastructures. Distributed applications and components can provide various data to the audit warehouse, including document numbers, document types, document content, user identifiers, roles, and relevant security data. The collaborative audit framework can also specify and snapshot document flow through the audit warehouse, as well as the proper assignment of steps and sub-steps in business processes.

The audit warehouse provides a system for carrying out ad hoc audits as well as for periodic spot checks, system checks or scheduled reports, data protection and automatic runtime alerts for certain violations. Because of the audit warehouse's inherent capability to monitor data over the long term, it can assist in alerting system administrators to data that are out of normative boundaries for historical data of the same type.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Introduction

The invention deals with audit systems for collaborative business processes. The term business process is intended to include, any type of procedure in which electronic records, commands, requests or data of any type are passed between users or entities for any purpose in any field, including business, financial, industrial, manufacturing, healthcare, educational, contracting, permitting, etc., in either the public or private sector. The term collaborative business, as used herein, is meant to encompass cross-enterprise or inter-company business processes, such as supply chain management.

As the business world moves toward Web Services these cross-enterprise systems present unique challenges for auditing. However, the audit challenge actually begins within the individual enterprise where competing interests vie for primacy on the IT landscape.

Figure 1:
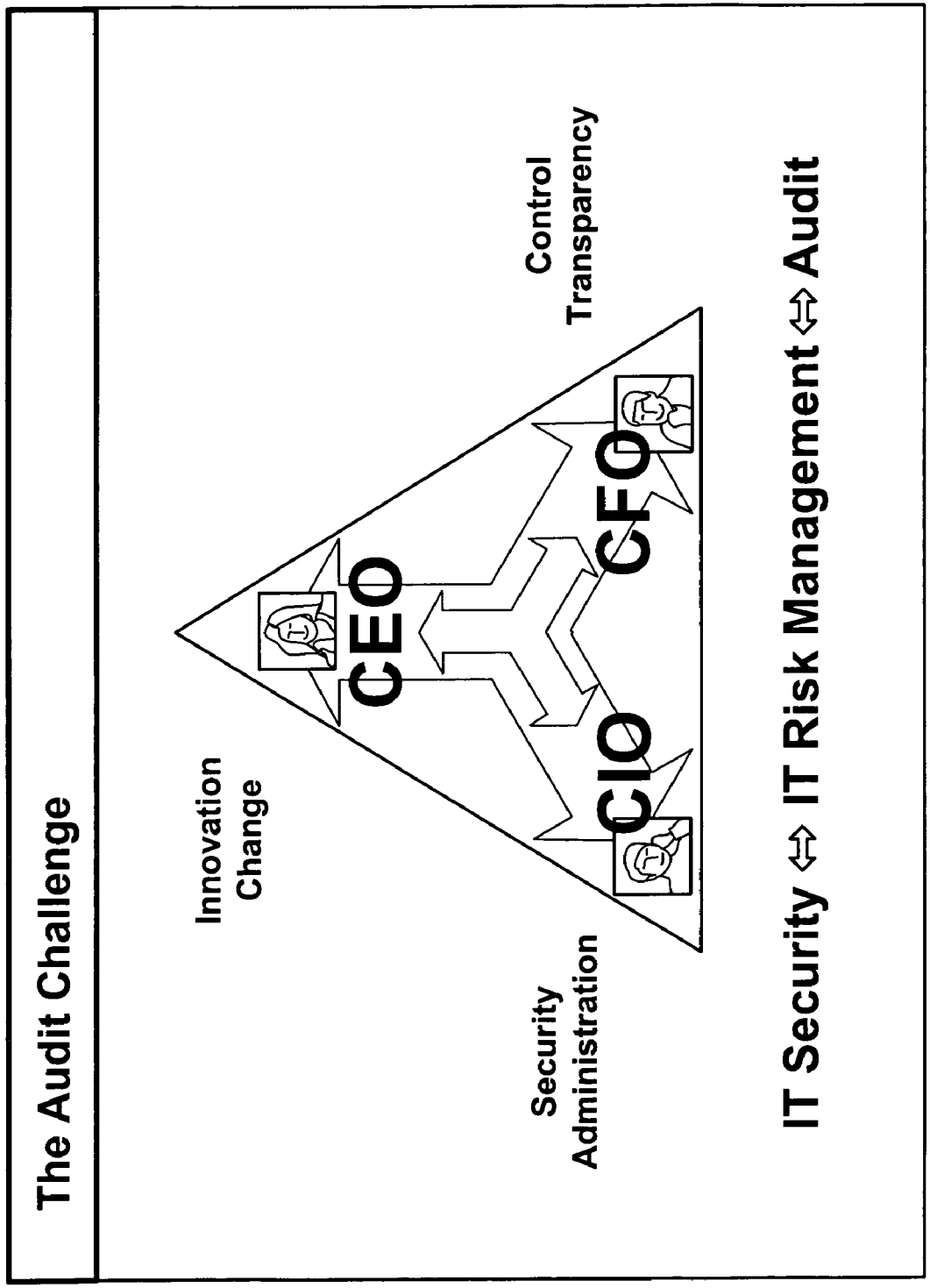
FIG. 1 is a diagram of the IT audit challenge posed by competing interests within the organization.

FIG. 1 illustrates the nature of the problem. IT risk management operates in two spheres, security systems and audit. IT security, the first sphere, encompasses all of the systems for insuring data security, e.g., passwords, authentication, authorizations, fire walls, encryption, and document passing rules. These systems establish the foundational mechanisms for secure transactions, as well as the rules for applying them. Audit, the other realm, checks on compliance with established IT security measures.

Both IT security systems and their auditability are challenged by the competing interests of executive functions within the business enterprise. The chief executive officer (CEO) is responsible for developing and executing the business model. The chief information officer (CIO) has the overall responsibility for security administration, i.e., providing secure systems that work to insure secure data. The chief financial officer (CFO) needs "transparent control," or the ability to understand and manipulate the financial data upon which the business is based, and which also happens to be the subject of IT security. In directing and hopefully improving the business, the CEO has to be able to enact changes, which directly or indirectly impact existing security systems, possibly compromising them. Changes ordered by the CEO also can threaten the open transparency of the enterprise IT system as secure systems undergo modification. Tightening of security by the CIO threatens transparent control by replacing systems, once optimized for control, with new systems. The CIO's orderly IT security administration is challenged by the CEO's need for change, and the CFO's need for transparent control. The CEO's need for change is constrained by the CIO's ability to accommodate modifications while maintaining tested security systems and maintaining or raising the level transparent control demanded by the CFO. The CFO's transparent control objective is thus also limited by the CIO's mission to maintain secure systems, and the CEO's requirement for change.

Auditable system landscapes are an essential prerequisite for e-business. After creating and implementing a comprehensive policy to ensure secure processes, a company then needs to prove that all of its business applications and processes—particularly those involving security mechanisms and authorization concepts—were followed and work as designed. This is especially important in cross-company scenarios, such as virtual exchanges, or when working with an application service provider.

Companies must be able to check the security of not only their own architecture, but also those of their business partners using technical revision procedures, because contracts and laws often demand proof of a secure environment. Comprehensive auditing frameworks that transcend individual businesses are thus destined to become an essential tool for ensuring audit-proof processes in collaborative scenarios.

Auditing Closed and Open Systems

Figure 2:
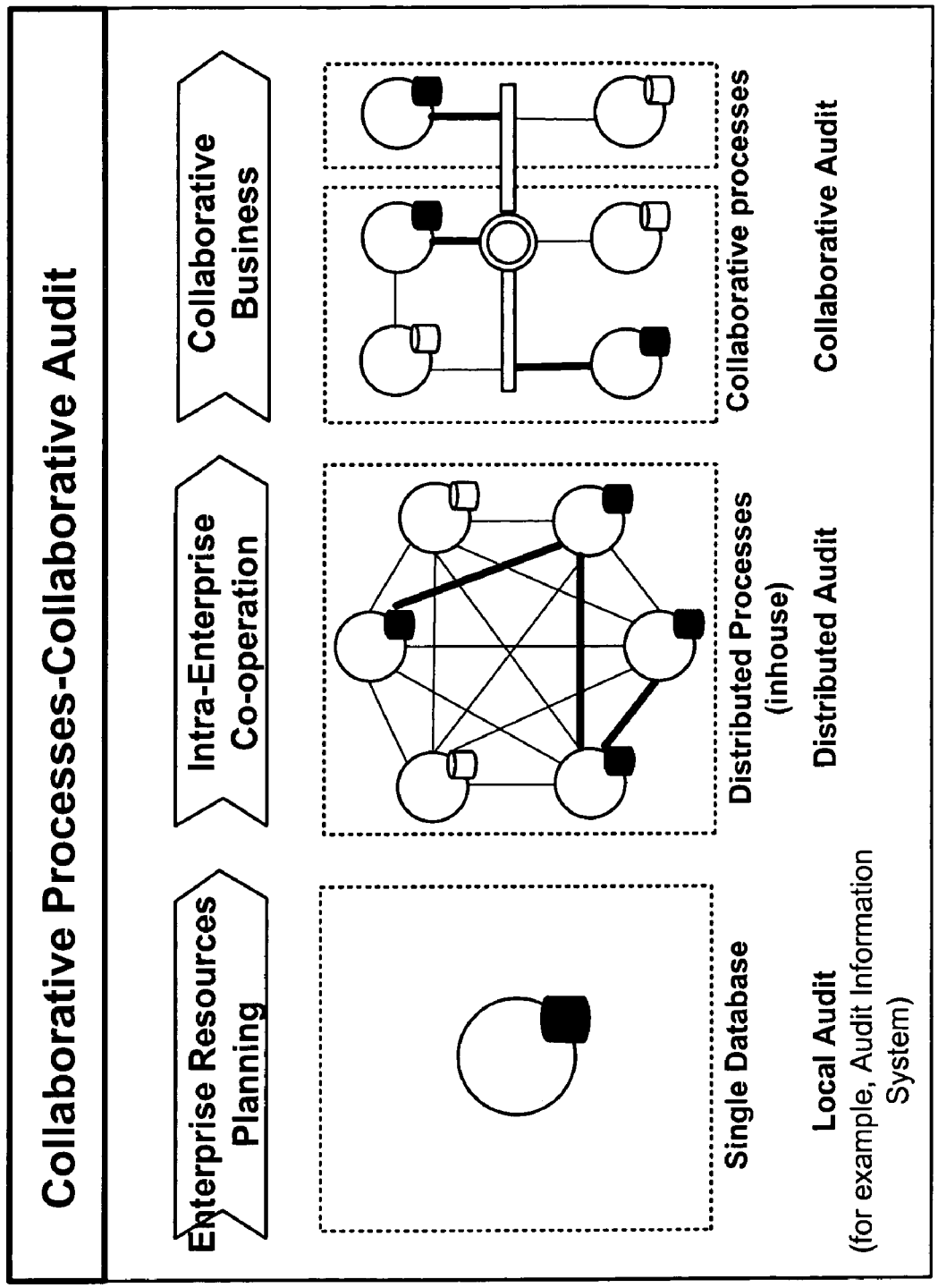
FIG. 2 is a diagram of the business processes landscape including individual, intra-enterprise and cross-enterprise collaborative systems.

FIG. 2 illustrates the evolution from closed to more and more open systems. In the type of system landscapes that have been common until now, business processes are each processed on a single computer system. The data for a business process is then stored in a single database, as shown on the left-hand side of FIG. 2. This individual system can be audited by conventional systems. The "SAP—Audit Information System" is an example of this type of local audit system.

In a closed system, the IT organization is usually responsible for all information security issues. This includes configuring authentication and authorization solutions according to the business needs defined by the applications. For example, it is often necessary to implement—and prove—a segregation-of-duties approach within the context of a specific application. In closed systems, a reporting framework that collects information about authorizations, roles, and the data related to users or processes generally provides sufficient auditing capabilities.

With distributed processing, as shown in the middle pane of FIG. 2, the data is successively changed and stored by different applications on different systems. The relevant data is distributed across multiple systems. Until now, it has been virtually impossible to trace and analyze cross-application business processes technically. This is particularly true when a business process addresses several systems that are provided by different manufacturers. The situation becomes more problematic if the process runs across the systems of different, collaborating companies, as illustrated on the right-hand side of FIG. 2. Auditing business processes between collaborating companies is difficult indeed. Nonetheless, both the trend toward open, collaborative business systems, using Web Services, for example, and also the growing recognition of the essential role of auditing in IT risk management continue unabated.

As open IT landscapes replace closed systems, processes are no longer limited to one application server and may flow through the entire IT environment. In situations like this, the auditing capabilities of each system—even sophisticated ones—no longer suffice. System interaction in collaborative processes results in even greater complexity. In addition, some components of the open landscape may contain sensitive information that belongs to different organizations. In virtual marketplaces, exchange infrastructures, or application service provider scenarios, this may even include data from competitors. As data in health care, supply chain, banking and financial service businesses, for example, become more dependent on interaction with other business entities over the Internet from a transactional standpoint, e.g., Web Services, the auditing capabilities of each individual system—even sophisticated ones—, internally challenged as they are, will no longer suffice.

Digital signatures, which guarantee nonrepudiation for documents exchanged across company boundaries, for example, orders or acknowledgements, can be an effective means to prove the integrity of business processes in heterogeneous environments. Queuing functions, such as those of SAP Exchange Infrastructure, can also provide possibilities for physically decoupling application components and guarantee that messages are delivered exactly once.

These options, however, solve only part of the auditing challenge in collaborative business environments. For example, SAP Exchange Infrastructure makes it possible to deploy a broad diversity of highly heterogeneous components from different vendors and various technology environments. This enables efficient and integrated business processes, but it also renders traditional auditing procedures virtually impossible. The data needed for the review of a single process can be stored in disparate systems on different platforms—and often not even within the same organization.

For a more comprehensive auditing solution, open auditing frameworks must be established. These frameworks allow applications in cross-enterprise business processes to take auditability into account from the very start, and they grant analysis tools access to this process-oriented information. Requirements for auditing frameworks include the ability to audit processes in distributed application landscapes and to perform a comprehensive audit of various applications and systems. For example, open auditing frameworks should ideally be usable for external or internal audits, system checks, and data protection checks. The radical solution is to divorce the audit function from the individual enterprises to the extent possible and replace it with a separately maintained entity, the audit warehouse, with a standardized, universal interface that all enterprises with collaborative businesses can share.

The Integration of an Audit Warehouse

Figure 3:
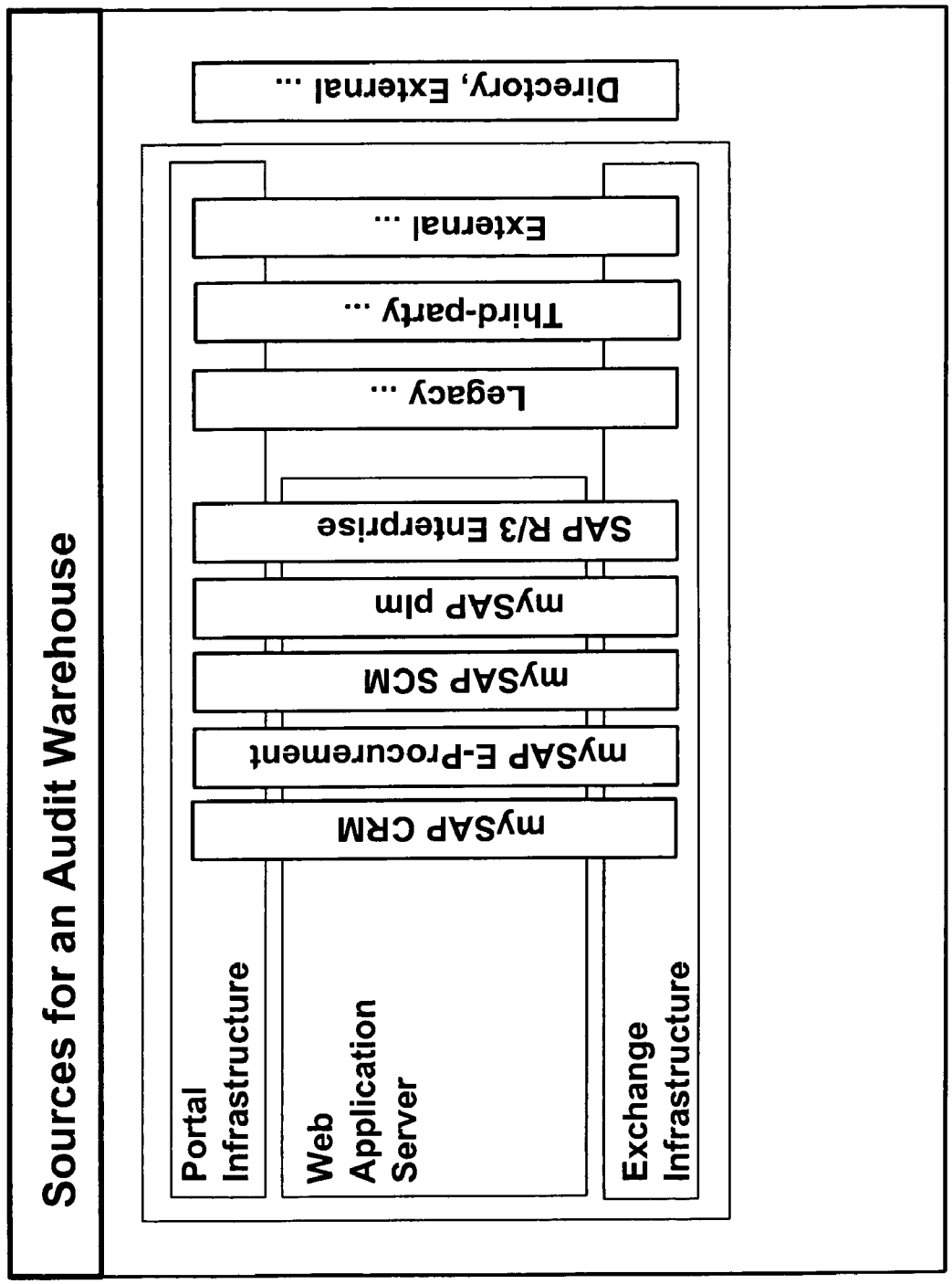
FIG. 3 is a diagram showing the sources of data input for an audit warehouse.
Figure 4:
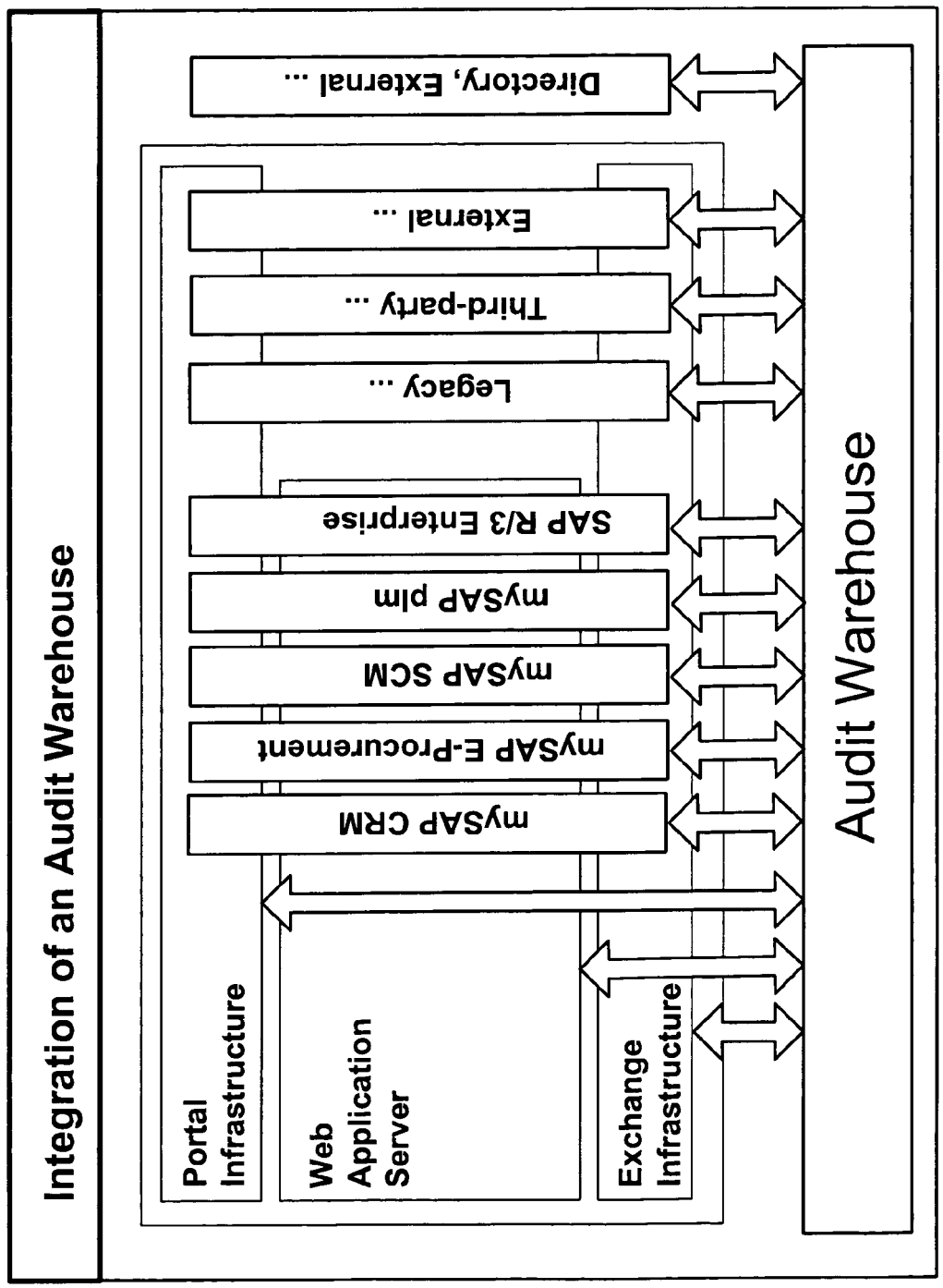
FIG. 4 is a diagram showing how the audit warehouse is integrated into the framework of FIG. 3.

In an environment where a number of organizations share services and information, it must be possible to audit all applications and systems that process business tasks. An example of the sources for an audit warehouse is illustrated in FIG. 3. To be comprehensive and effective, the audited data must encompass all applications and systems that the audited business process uses. Examples are the typical set of SAP applications such as customer relationship manager (mySAP CRM), production management (mySAP PLM), enterprise software like R/3, other non-SAP legacy and third party, and externally accessed applications. The list of sources also includes infrastructure elements, such as directories for user administration and the "integration Middleware", which provides the communications flow, e.g., the integration directory of SAP Exchange Infrastructure, which provides the communication and information flow between the different components. It keeps track of the entire system landscape, including the connections between the various components, and contains detailed collaboration knowledge. Accordingly, as shown in FIG. 4, all of the entities shown in FIG. 3 must be in communication with the audit warehouse, as indicated by the arrows.

SAP® Solution Manager, a tool that graphically maps a solution landscape and monitors core business processes, including all integrated systems, contains information about the components implemented in each business scenario. It is responsible for system, application, and business process monitoring. The process information stored in SAP Solution Manager can also be retrieved by the audit warehouse for auditing purposes. Thus in this case rather than just applications sending audit data to the audit warehouse, the warehouse would make use of system wide collection and monitoring available within a given enterprise.

Figure 5:
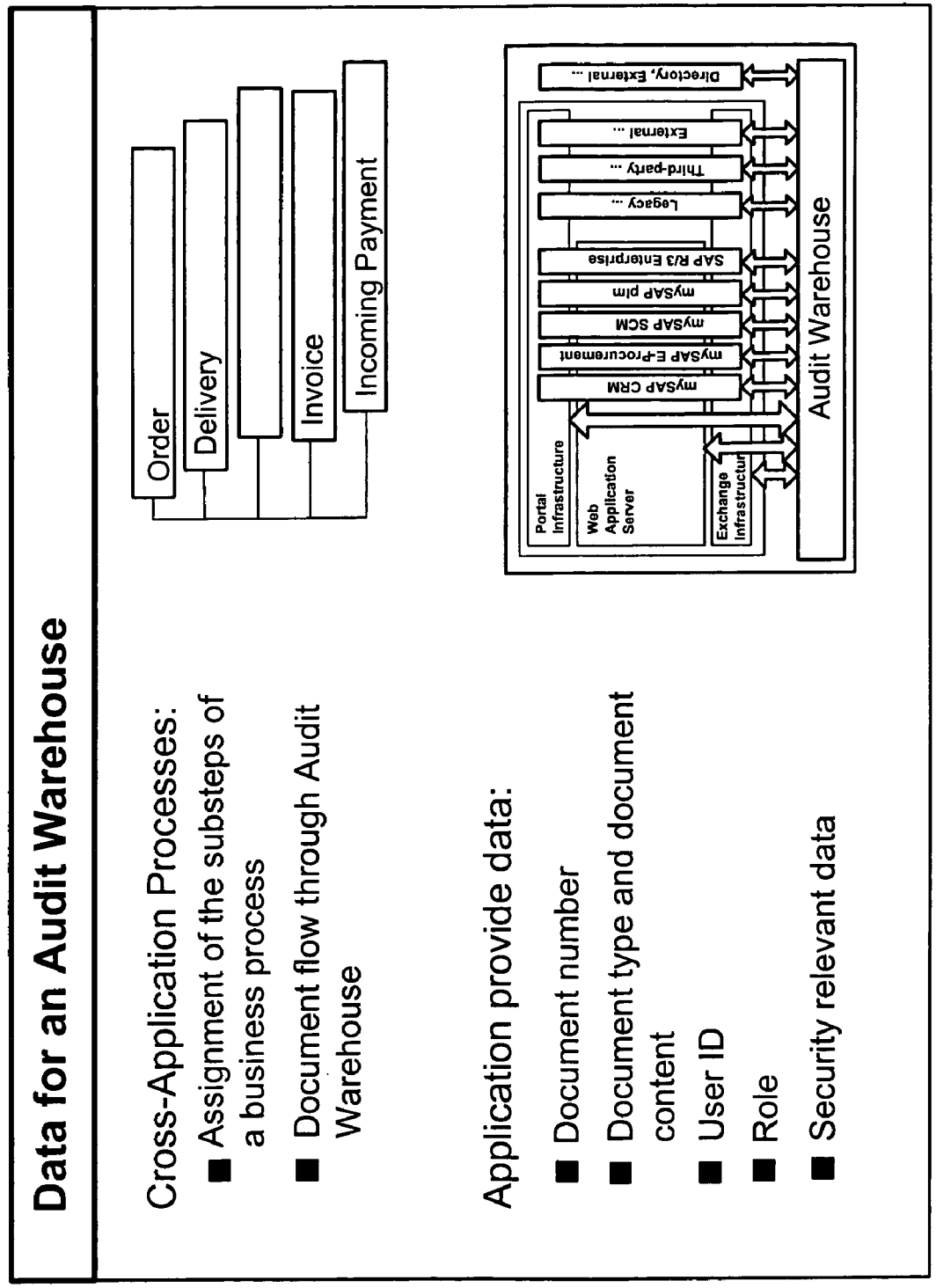
FIG. 5 is a diagram illustrating the types of data provided by the application servers to the audit warehouse.

As illustrated in FIG. 5, once the necessary data is extracted from all relevant sources, it needs to be analyzed centrally to gain a comprehensive overview of cross-application and cross-company business processes. An audit warehouse can collect the relevant information and provide an easily accessible data source for all auditing tools. It consolidates business documents for every subprocess, such as the ordering, delivery, invoicing, and payment steps in a sales process. This enables auditing tools to trace the document flow through several applications. The Audit Warehouse must be able to hold the documents for the individual subprocess steps together. Only in this way is it possible to understand a document flow through several applications.

The applications must provide the Audit Warehouse with the information that makes this overview possible. The applications themselves must provide the audit warehouse with the necessary information, including document number, type and content, user ID, and role, as well as other data relevant for security checks.

Figure 6:
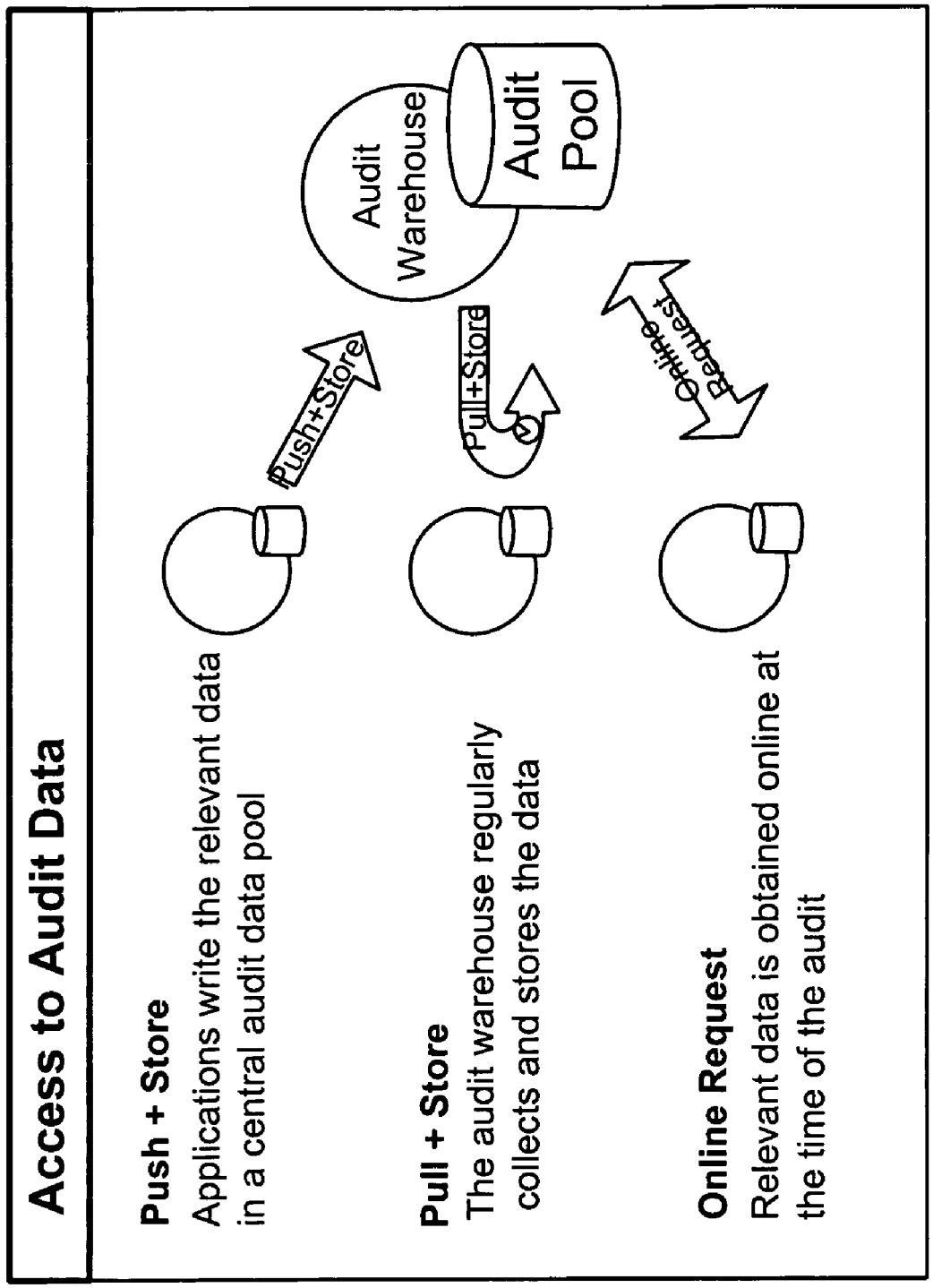
FIG. 6 is a diagram illustrating three modalities of audit data input from applications to the audit warehouse.

As shown in FIG. 6, the audit data from the applications can be made available to the audit warehouse in at least three distinct types of access. The first type called "Push", the applications write the relevant data to the central audit pool, i.e. the database maintained by the audit warehouse. The second type of access is "Pull": The central audit warehouse regularly collects the data using the interface and stores the data in the central audit pool. The third type of access is the "Online Request". With this type of access, the Audit Warehouse can address the interfaces of the relevant systems and collect the data at the time of the audit. In order to do this, the Audit Warehouse must, of course, know where the relevant data is (roughly comparable to a metadirectory).

Figure 7:
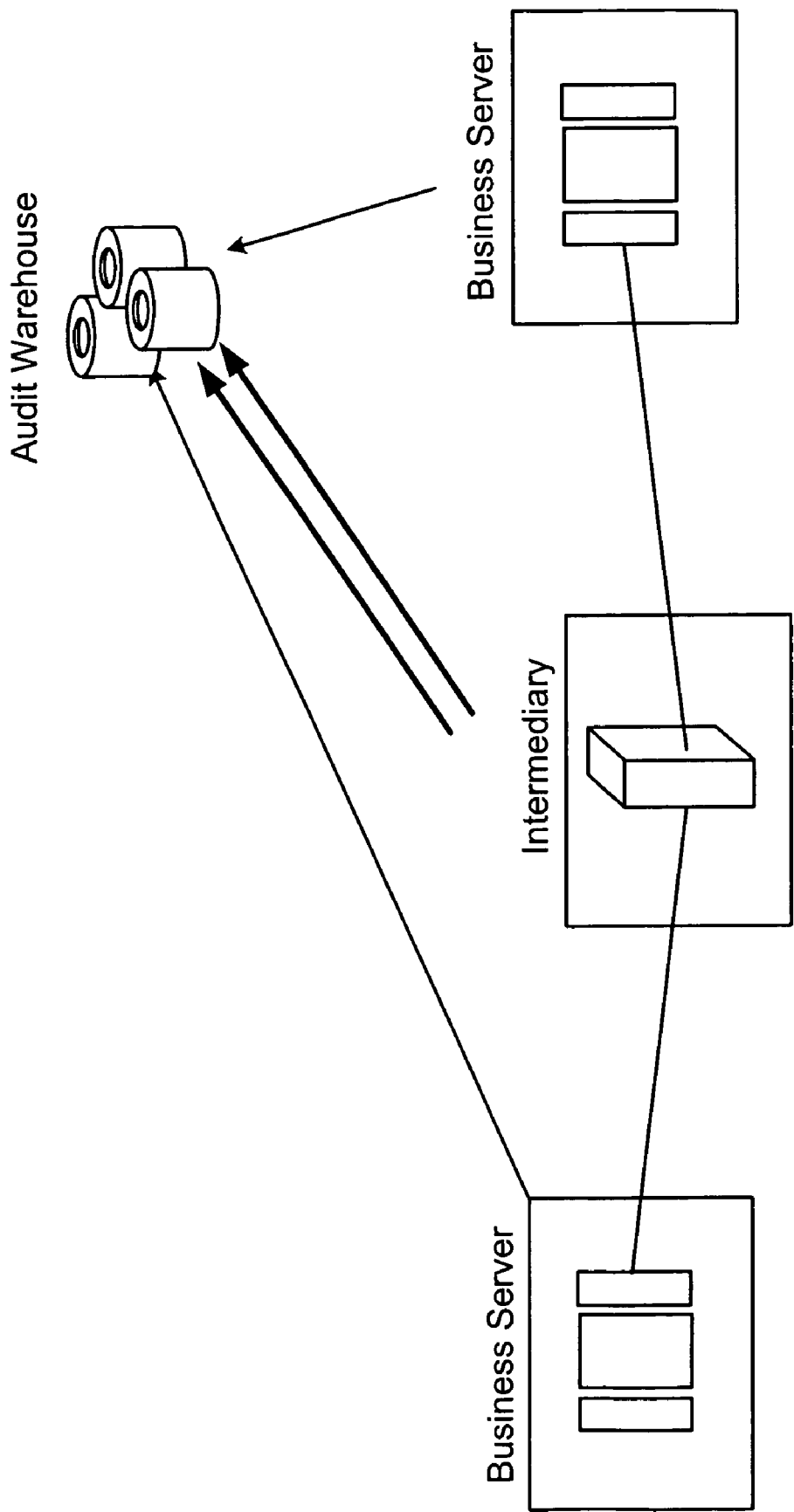
FIG. 7 is a diagram of the relationship between a collaborative audit data warehouse and business process servers involved in providing Web Services.

The trend toward web services raises the bar in the auditability challenge. With Web Service systems like Microsoft's Net Passport, intermediaries are implicated in the audit, as shown in FIG. 7. Here, secure message and authentication, and authorization issues are managed between several entities, which are not under common control. Information relevant to the security of the business process must be retrieved from the intermediary, but confidential third party information, as indicated by the second arrow between the intermediary and the warehouse, must be handled separately so as to hide the sensitive information.

Figure 8:
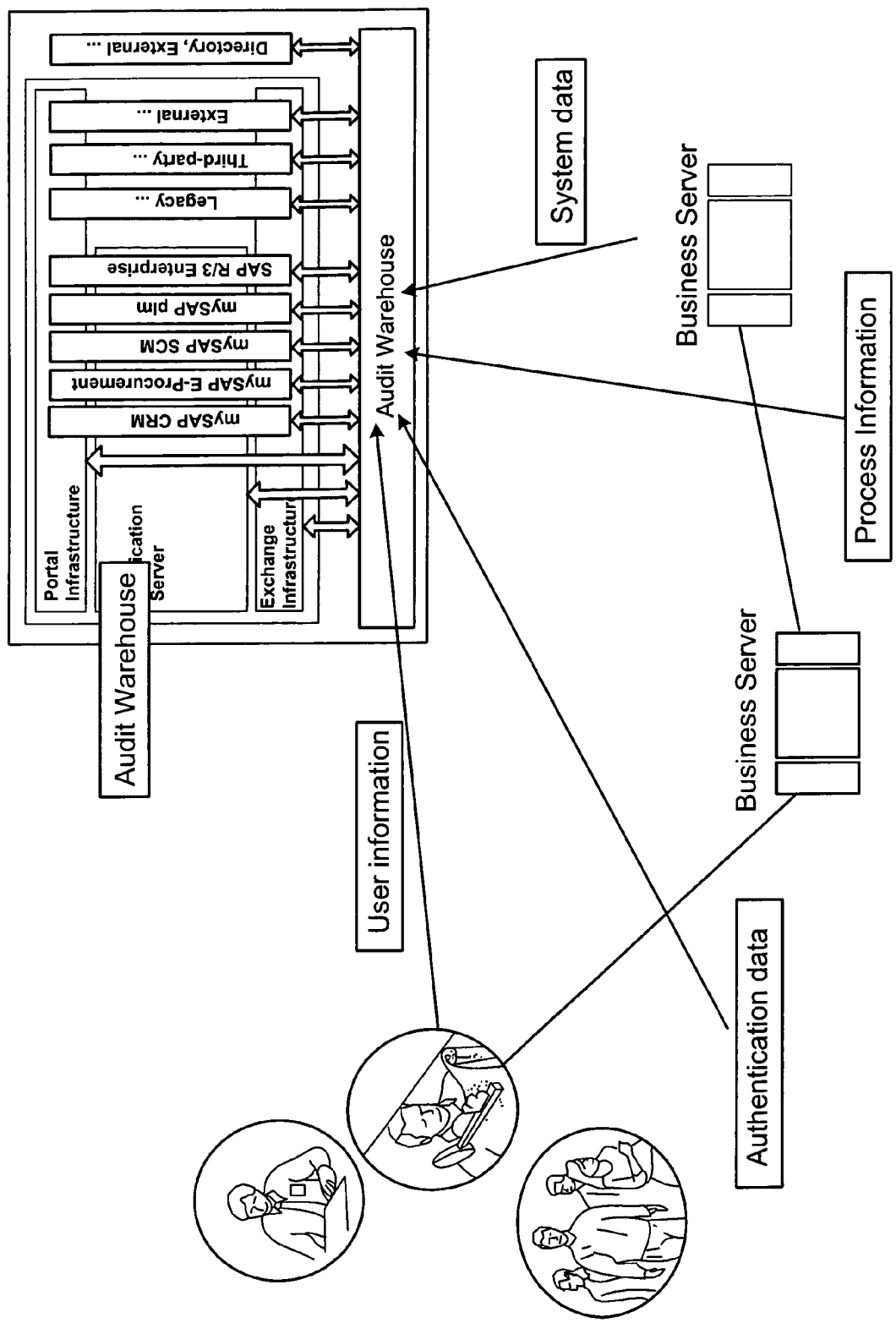
FIG. 8 is a diagram of illustrating auditing Web Services.

As shown in FIG. 8, in order to insure the integrity of the business process running in a web services environment, the audit warehouse must collect user information and authentication data, along with process and system information from remote servers involved in each transaction.

Figure 9:
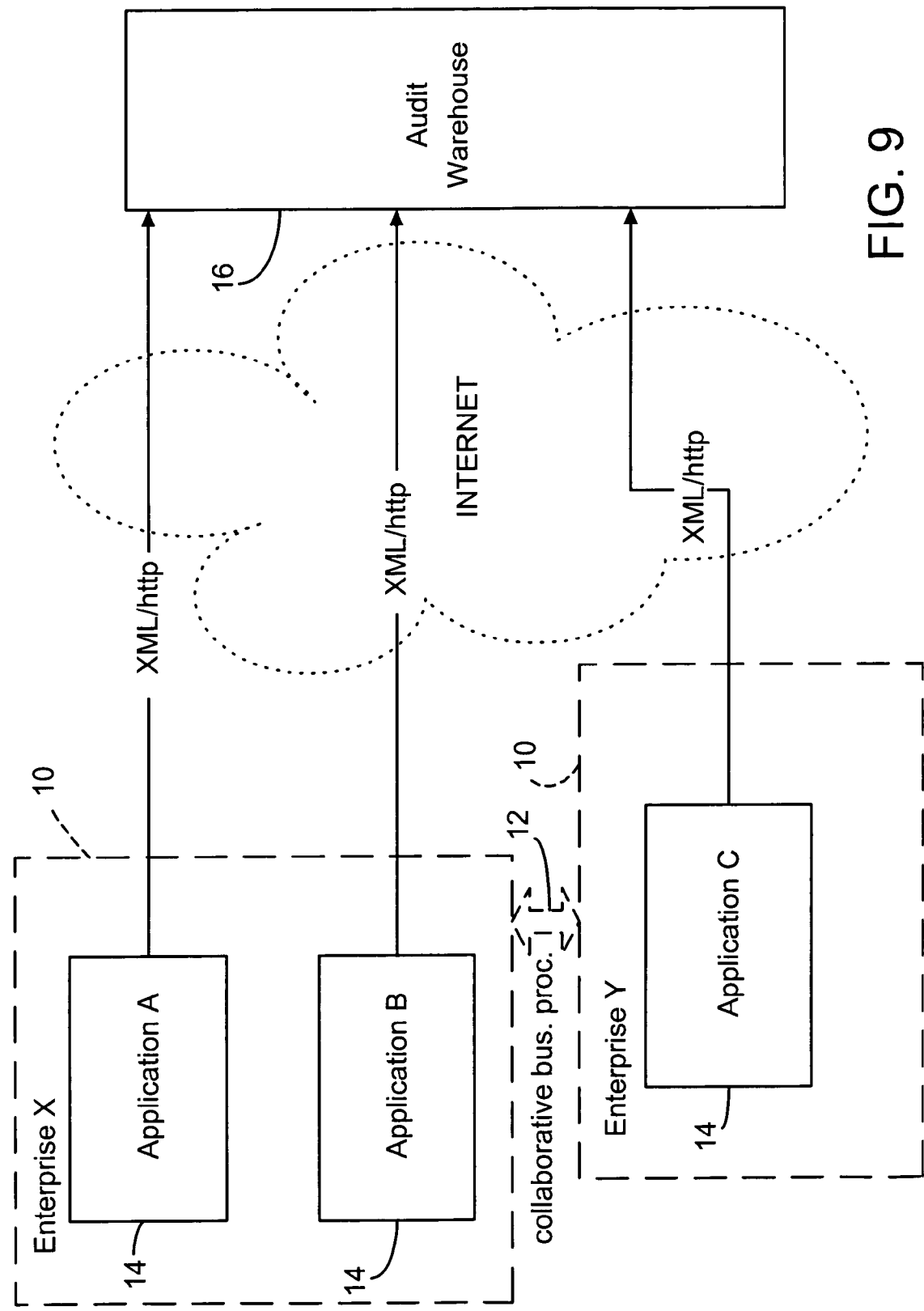
FIG. 9 is a block diagram of several applications feeding data to an audit data warehouse from multiple enterprises via http transfer of XML documents.

FIG. 9 shows an overview of the audit warehouse system in the process of collecting data from applications. Multiple distinct enterprises 10 share a business connection 12 providing interaction between a plurality of software applications 14 conducting a collaborative business process. Each of the applications 14 is equipped with an interface for formulating and transmitting audit data to a central audit warehouse 16 over the Internet using the World Wide Web (the "Web") norm of http data transport. This would be an example of the "push +store" type of data collection (see FIG. 6), where applications themselves decide when and what to furnish to the audit warehouse 16. The warehouse 16 preferably has a standardized open interface to access application data.

An XML-based audit data interface provides an open nonproprietary vehicle for transferring audit related data that can be supported by all applications. Extensible Mark-up Language (XML) is a set of rules for structuring data in a document that can be exchanged over the Web. XML is a subset of an early mark-up language SGML used for technical documentation. XML's particular aim is to simplify SGML and make it compatible with the Web like HTML. But unlike HTML the tags and attributes within XML can all be user-defined as desired, not just for browsers but for any target program. XML is an open standard developed and maintained by the World Wide Web Consortium (W3C). A copy of the current specification for XML 1.0 can be found at http://www.w3.org/TR/REC-xml, which is a stable HTML document offered by WC3 specifically to be used as reference material or cited as a normative reference from another document. The XML standard is a set of strict rules that specify well-formed XML documents, involving tags, namespaces and attributes, etc. These variable parameters give meaning in the context of the target program to data contained within what is actually a text document, one that, as we shall see below, can be visualized with any word processing system. An XML document's purpose, however, is to be parsed and processed by an XML processor that tests the document for validity and sorts out and conditions the data in the XML document and, for example, feeds it to an associated application. Various types of XML documents are the subject of specifications adopted by W3C, which would be the ultimate aim of the XML audit interface described here. The specifications are expressed in terms of a document template description or DTD.

Thus, as shown in FIG. 9, the data coming from the applications is in the form of XML documents over http. The XML documents identify the source and type of data and other parameters to identify the function of the data, e.g., in the business process. The basic form of the DTD for the XML interface is described in more detail below.

The paradigm of FIG. 9 implies that a common warehouse might be shared by each of the enterprises involved in the collaborative business process. This is possible, however, it would require a cooperative relationship between the enterprises with respect to the shared warehouse which might be problematic to establish and administer, especially in situations where the enterprises are not only not commonly owned, but are competitors or have similar business relationships with other entities that compete with the other enterprise. The common warehouse would either have to be owned and maintained by a trusted third party entity as a service to the enterprises or co-owned by the enterprises themselves. In either case, the transfer of proprietary data to a warehouse not under the exclusive control and access of the enterprise sending the data could impact the quality of the audit data exchange for the business process as a whole. One way this would be negatively impacted would be if it required that all of the audit data be transferred in a highly restricted manner.

Figure 9A:
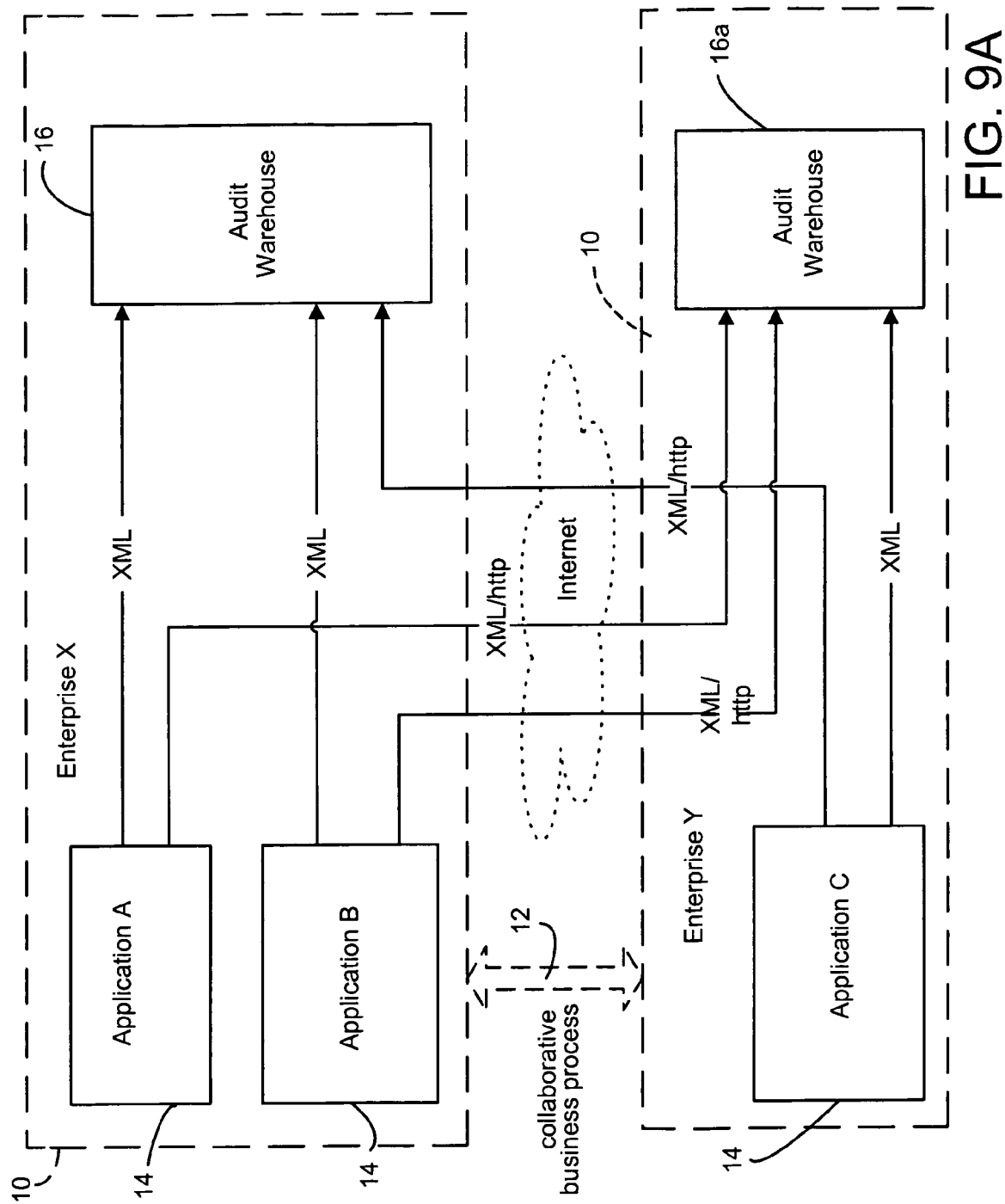
FIG. 9A is a block diagram of several applications in two enterprises feeding data to audit data warehouses owned by the respective enterprise.

Another model that may be more workable in practice is to have each enterprise requiring audit capability own and maintain its own data warehouse, as shown in FIG. 9A. In this model enterprise X has an audit data warehouse 16 and enterprise Y has another audit data warehouse 16a. These parallel warehouses need not be part of the enterprise software environment as shown, but could be remote and connected via the Internet, as in FIG. 9, to both of the respective enterprises although each audit data warehouse would still be owned and maintained by only one respective enterprise. Each warehouse receives audit data from the three applications A, B and C, for example. The format and transfer medium for all of the applications can still be according to a common XML specification. If the warehouse is internal to a given enterprise software landscape, the transfer protocol from the applications within the same enterprise need not be limited to http, as suggested in FIG. 9A. Note that in the arrangement of FIG. 9A, each warehouse 16 or 16a is still properly characterized as a central audit data warehouse since it receives data from all of the applications involved in the business process, potentially across enterprise boundaries as shown in FIG. 9A.

The advantage of the proprietary collaborative audit data warehouse paradigm is that the interface with the applications that are part of the same enterprise that owns a given warehouse can be unrestricted. Data from application C in foreign enterprise Y can be transferred to enterprise X's warehouse 16 via a restricted interface if desired, so that proprietary data of enterprise Y is not accessible to enterprise X. Likewise, audit data from applications A and B of enterprise X can be transferred to enterprise Y's warehouse 16a via a restricted interface, if desired, so that proprietary or sensitive data of enterprise Y is not compromised. Thus, the two audit data streams from application C, for example, are shown as distinct message streams even though they carry essentially the same audit data for the same business process. They are differentiated in the system of FIG. 9A according to whether the data is destined for enterprise Y's own warehouse or that of the other enterprise X, in which case the transfer is restricted in some appropriate manner while still providing adequate access to audit data to satisfy the needs of the business process audit.

Figure 10:
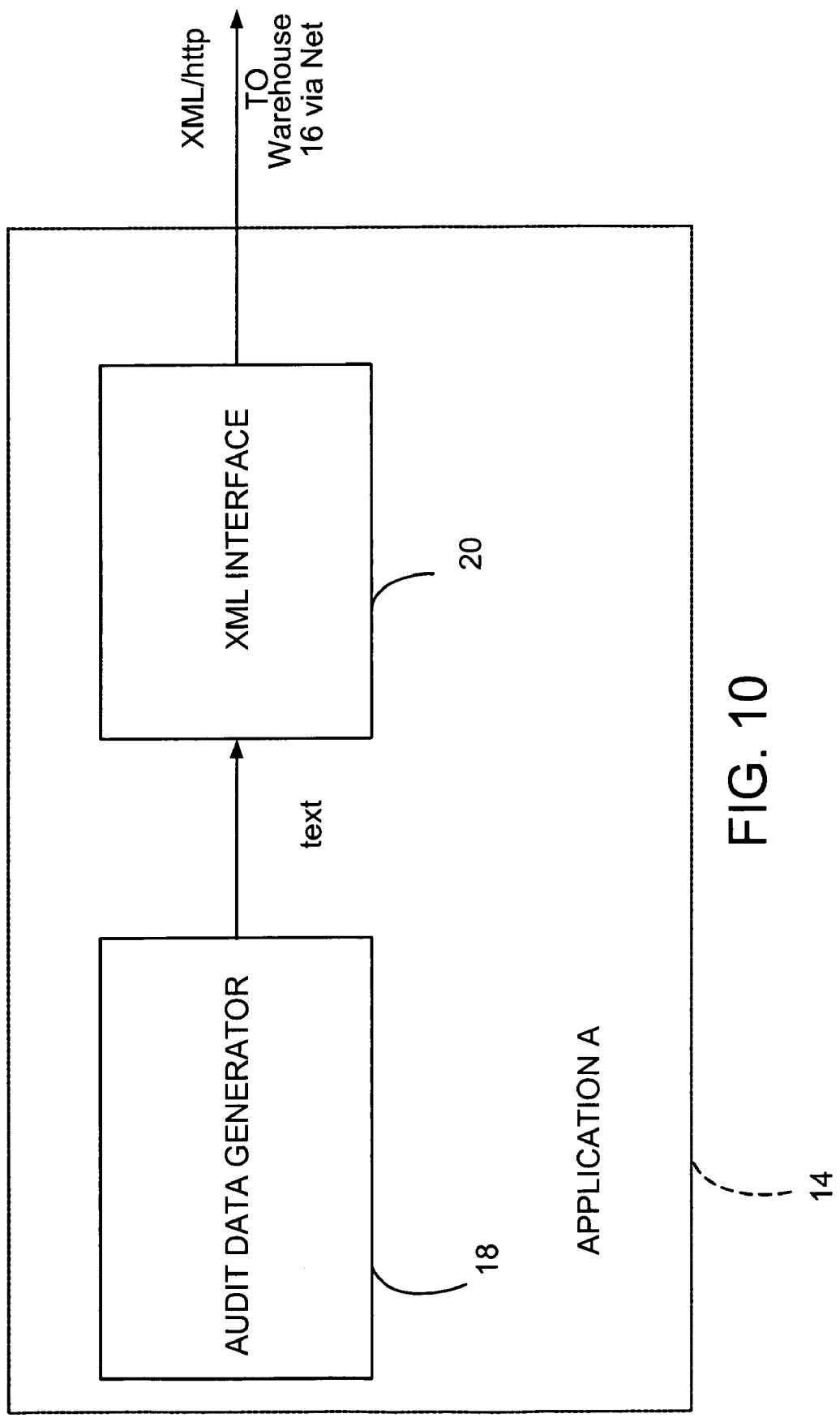
FIG. 10 is a block diagram of application A of FIG. 9 showing the XML interface.
Figure 10A:
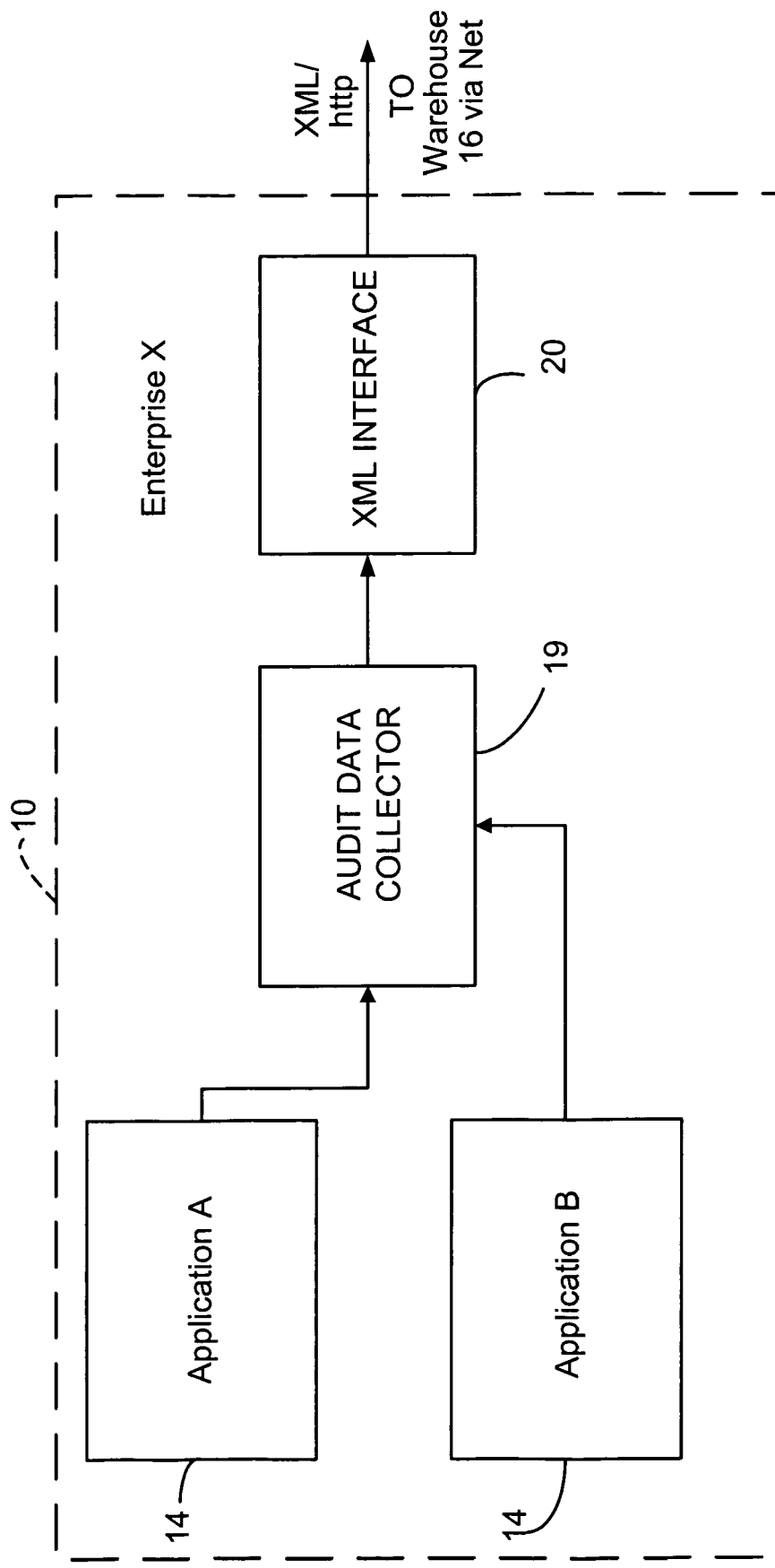
FIG. 10A is a block diagram of an enterprise having its own audit collector as well as an XML interface to the audit warehouse.

As shown in FIG. 10, application A (14) is capable of generating its own audit data by way of a native audit data generator 18. This would often be the case for business applications, for example, that are designed to act as a single database business process solution or part of a distributed solution within a single enterprise. The output of the audit data generator 18 is passed to a XML interface 20 which is designed to interpret the audit data output and translate it into the specified XML format, which is then passed via http over the Web to the audit warehouse 16.

Figure 11:
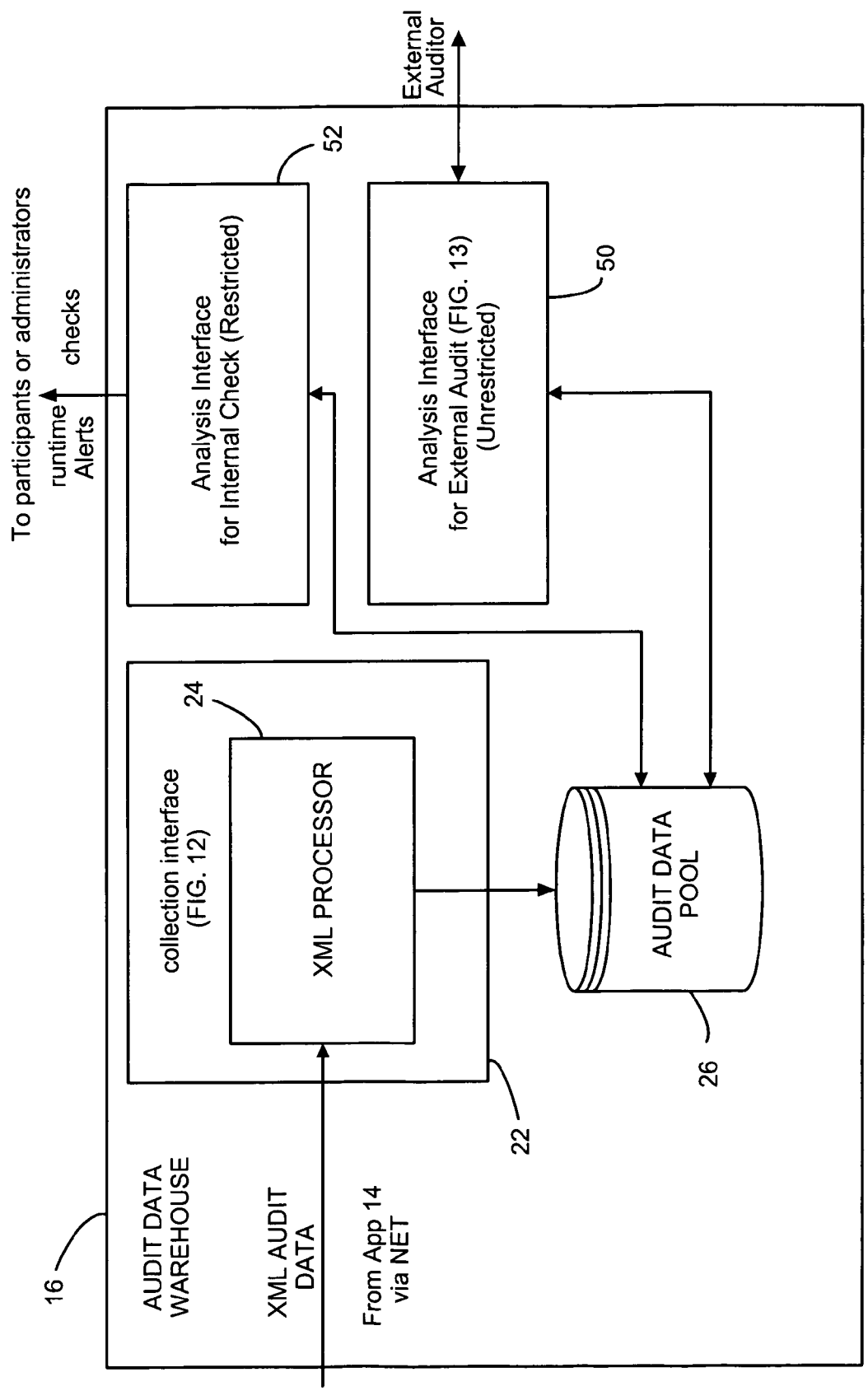
FIG. 11 is a block diagram of the audit warehouse of FIG. 9 showing the collection and analysis interfaces

Meanwhile inside the audit warehouse 16, as shown in FIG. 11, the XML audit data transmitted by application 14 is received by an audit data collection interface 22. The collection interface. 22 includes an XML processor 24, which is designed to interpret the XML documents and in conjunction with a sorting and storing function, transfer the audit data to the corresponding storage bins in the corresponding audit data pool 26 in the data warehouse 16.

Figure 12:
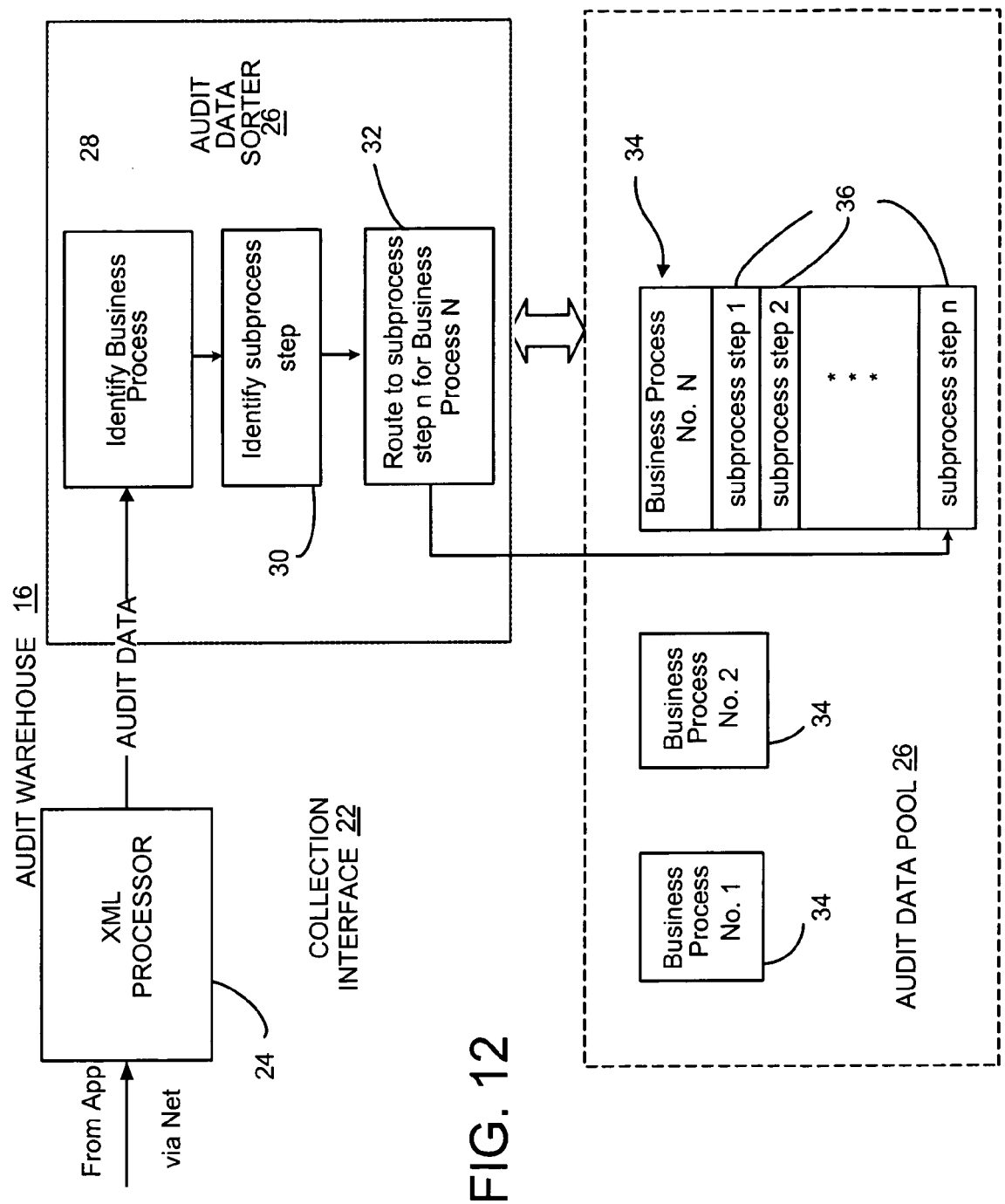
FIG. 12 is a block diagram of the audit warehouse of FIG. 11 showing the collection interface in more detail.

The collection interface 22, shown in more detail in FIG. 12, also includes an audit data sorter 26 that receives and interprets the output of the XML processor 24. The audit data sorter 26 includes three functional blocks, identify business process 28, identify subprocess step 30 and then route the audit data to the associated business process step which has a corresponding storage location in the data pool 26. The data pool 26 in this example is a relational database having records associated with distinct business processes 34 (Nos. 1, 2 through N shown) and elements, attributes or steps 34, of each process 34. The individual steps of one business process 34 designated No. N are shown in FIG. 12. Thus, upon discovering audit data properly associated with step n of business process N, the audit data is stored in the audit data pool in association with process N step n. In this manner all audit data for process N step n can be assembled, aggregated and examined in the audit or check process together.

The data warehouse 16 also provides two distinct types of output interfaces shown in FIG. 11: an analysis interface for external audit 50 and an analysis interface for internal check 52. Interface 52 runs autonomous applications under control of the audit warehouse itself that have been established by participating enterprises or the warehouse administrator to run periodic checks or reports and screen data for violations. Thus the output of the internal check interface can be in the form of alerts to the participants as well as reports of periodic checks or spot checks for compliance with security procedures.

Figure 13:
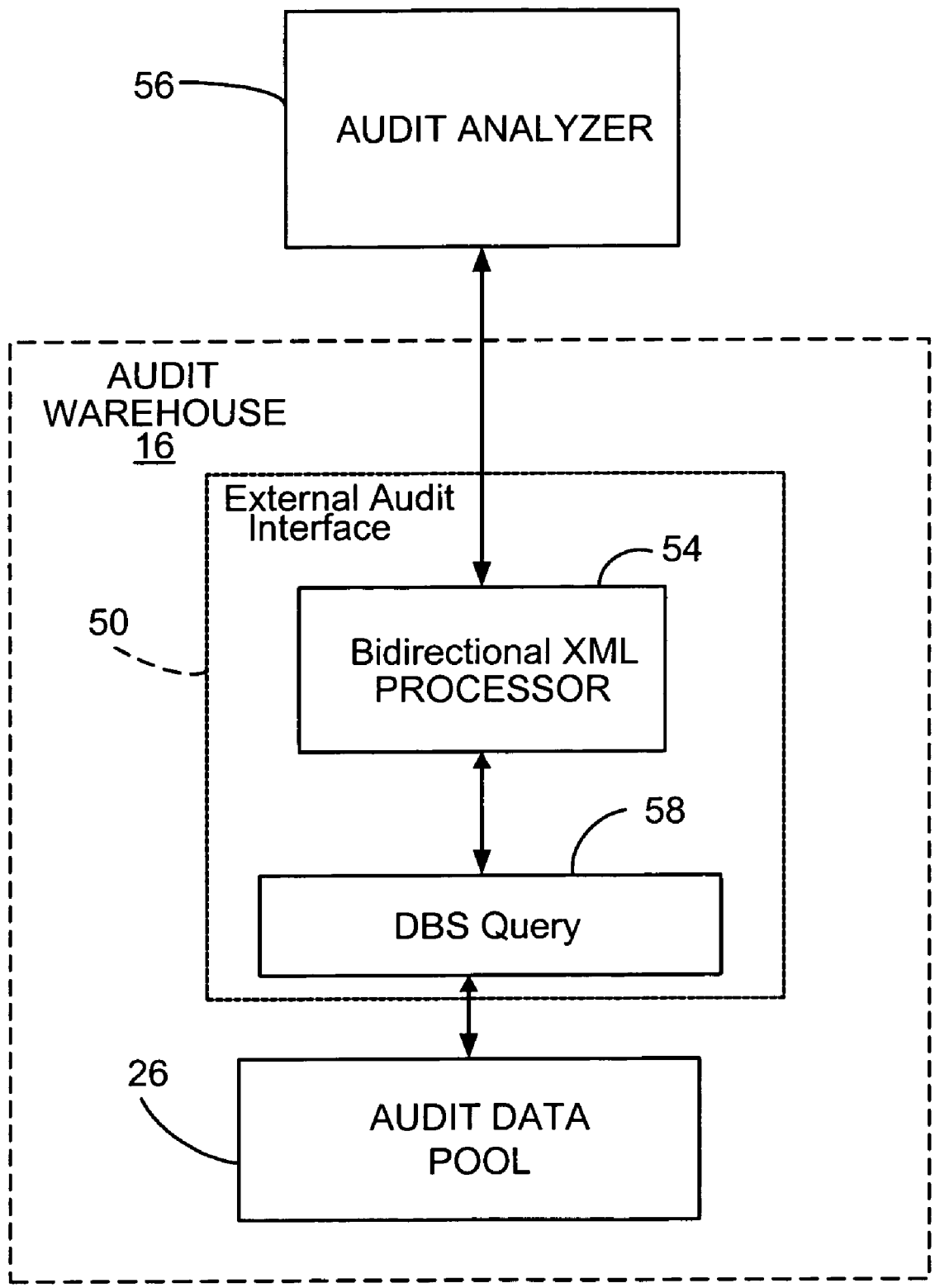
FIG. 13 is a block diagram of the audit warehouse of FIG. 11 showing the external audit interface in more detail.

The data collected in the audit warehouse can be analyzed by standard analysis programs to perform the checks, such as the Audit Information System or SAP® Business Information Warehouse (SAP® BW). The medium through which this occurs is the analysis interface for external audit 50, shown in more detail in FIG. 13. The external audit interface includes a two-way or bi-directional XML processor 54 for which interfaces an external audit system 56 with a database query system 58 for interrogating the audit data pool 26. The external audit analyzer 56 has to have an XML interface for composing XML documents to request audit data from the warehouse 16. The incoming XML documents are interpreted and translated into the appropriate database queries and report formats. The corresponding data retrieved from the pool 26, for example, the audit data for step n of business process N (see. FIG. 12) is extracted and reported back to the external audit system 56 via an XML document passed over the Web. At the other end the XML document is processed and interpreted to complete the report to the outside participant or administrator that formulated the audit request.

The audit framework also works across company boundaries. It is sometimes required that participants in a business chain (like suppliers and outsourcers for example) are audited together.

The audit framework works in two scenarios:

A. During normal operation, it transmits information to external partners through a restricted interface, this being useful for detecting fraud and bottlenecks across companies. This would correspond to the internal analysis interface; and B. When auditing the business chain, it correlates the information through an unrestricted interface, so that the aggregation then happens for all the process steps.

XML DTD Definition

The XML format for the audit warehouse interface offers portability and standardization. The portability of the XML standard is attributable to the fact that it was designed to be platform, database, and operating system independent. The standardization is found in a common set of standards established and maintained by an open committee for syntax, semantics and processing of all XML rev. 1.0 compliant documents on the Web. In addition, XML exhibits flexibility, usability and scalability. XML documents do not have any inherent constraints regarding size or content. The tags and attributes are defined by the warehouse system architects. Ideally agreement will be found one single set of XML compliant specifications for audit warehouses of the type described here.

There will be of course several types of XML documents involved in the warehouse: one class for the collection interface and one for the external audit reports, i.e. input and output. However, the specifications should be consistent and in many cases identical for both types of XML documents. As a guide and example for XML specification, the DTD for the audit report format is presented below.

Figure 14:
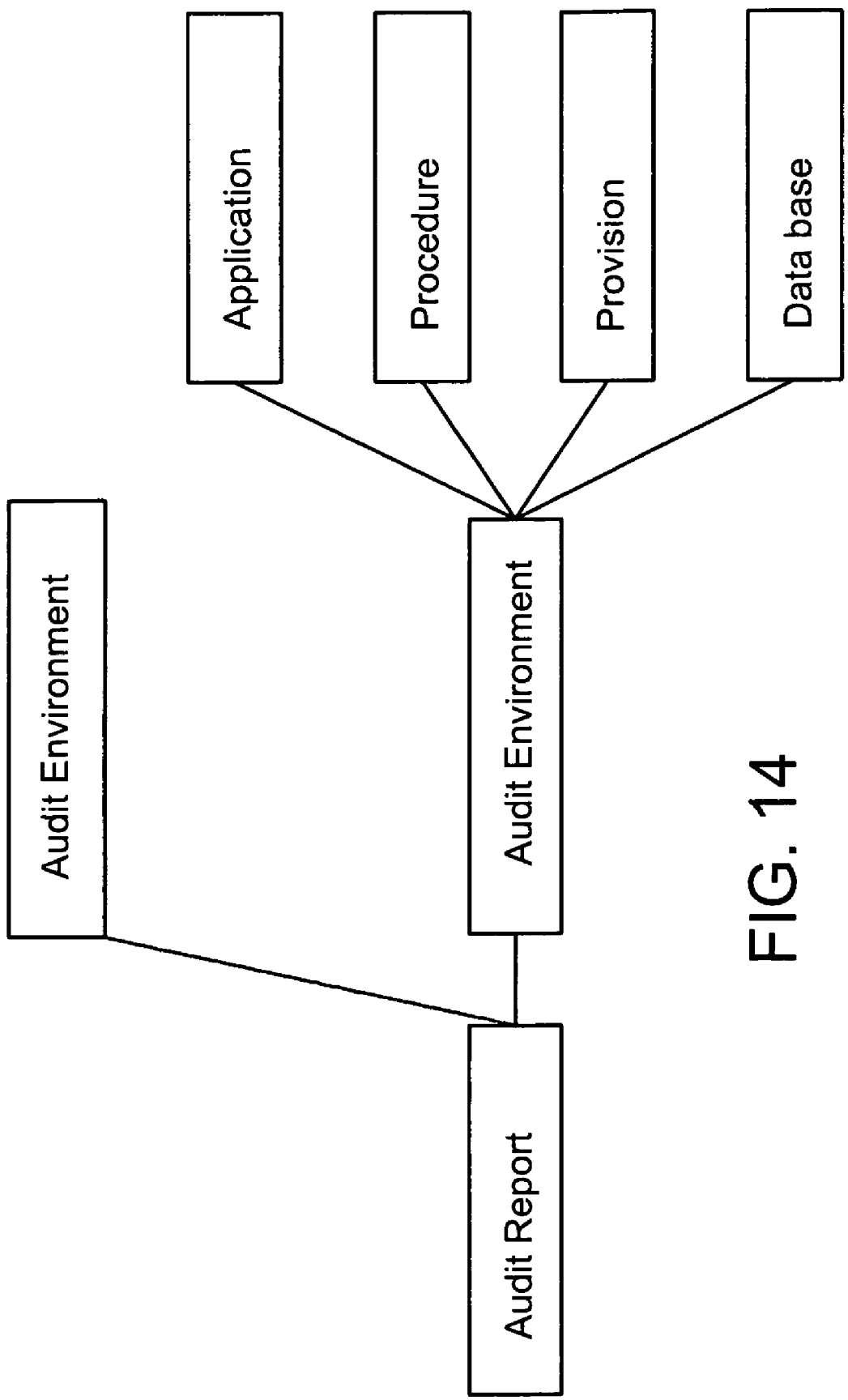
FIG. 14 is a block diagram of the DTD for the XML audit report format.
Figure 15:
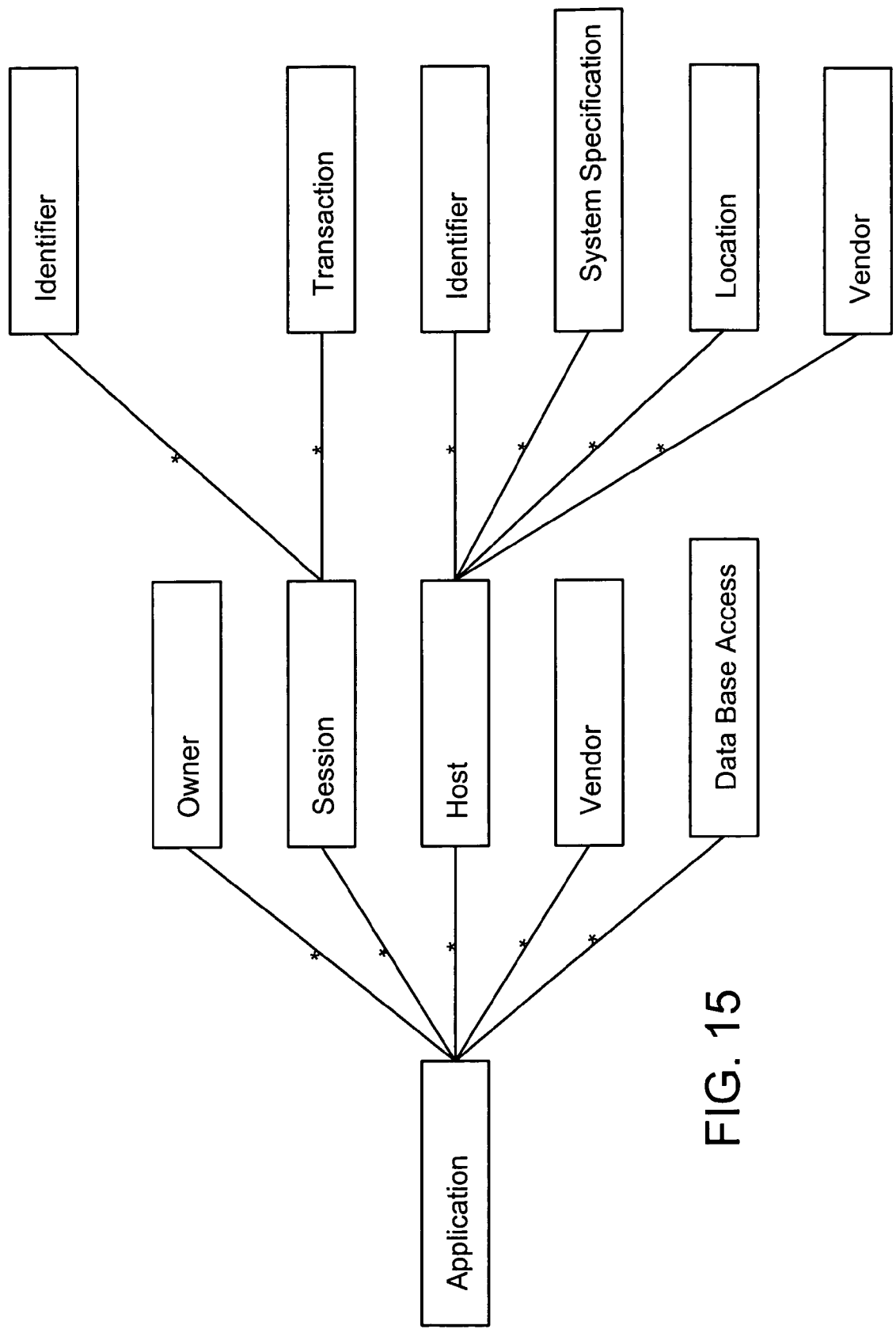
FIG. 15 is a block diagram of the DTD for the application part of the audit report of FIG. 14.
Figure 16:
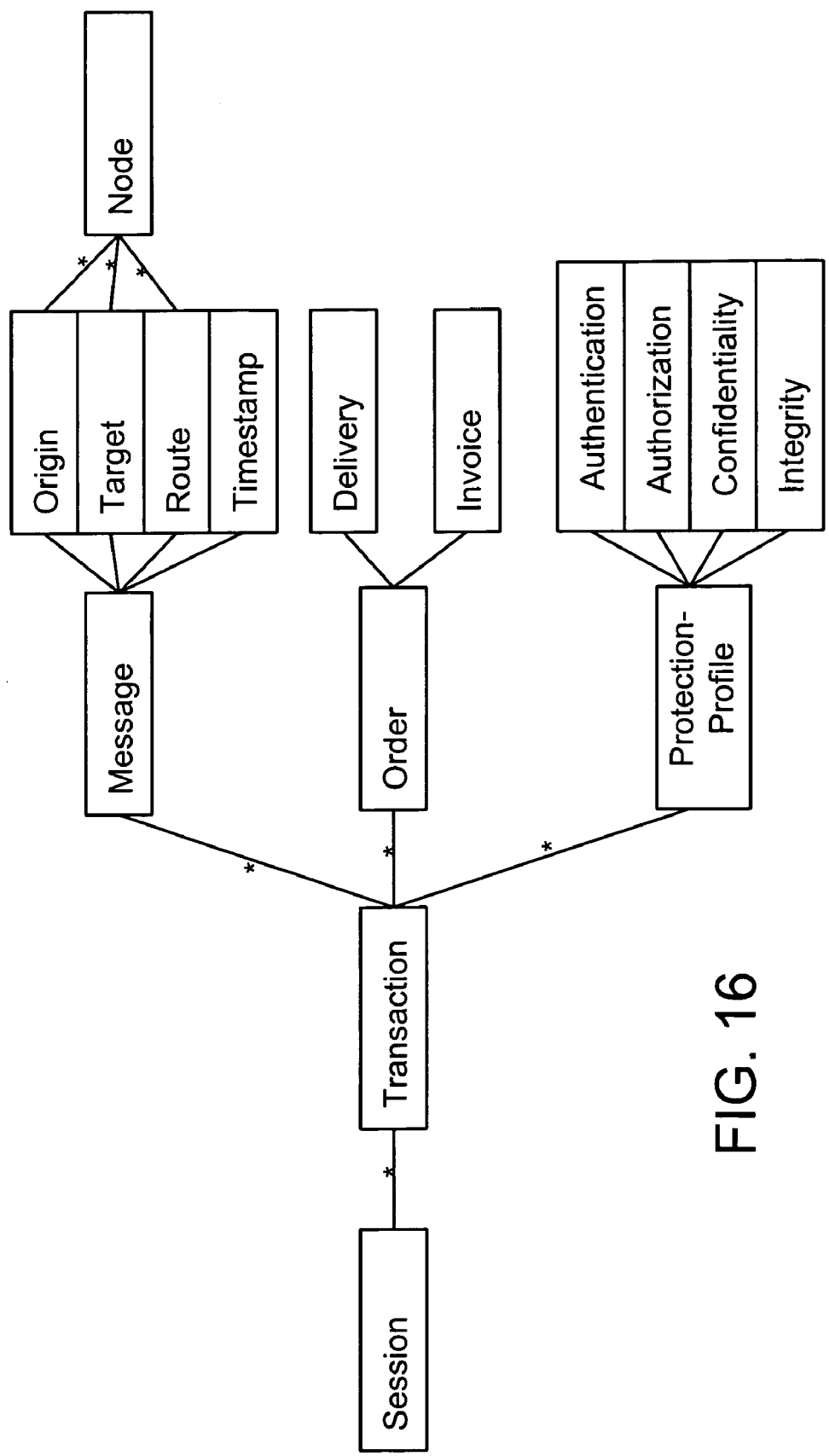
FIG. 16 is a block diagram of the DTD for the session part of the application DTD of FIG. 15.
Figure 17:
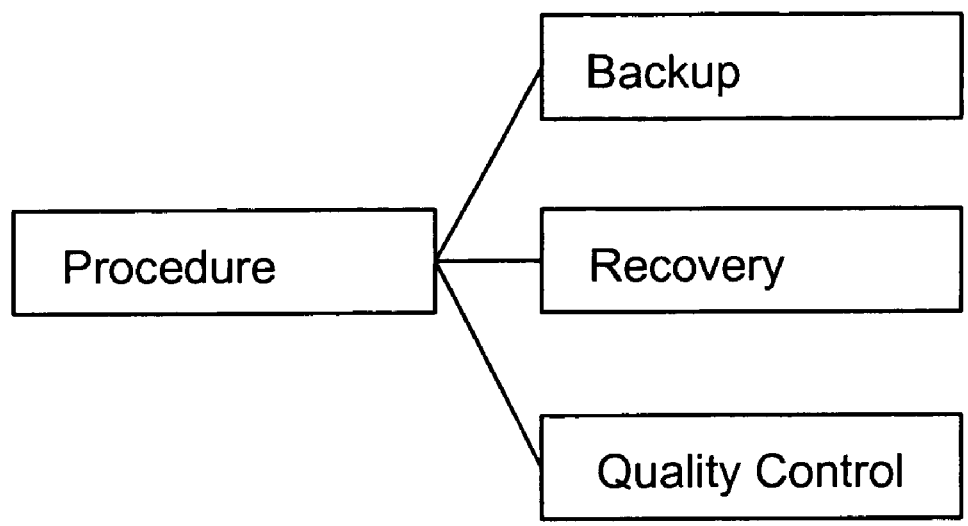
FIG. 17 is a block diagram of the DTD for the procedure part of the audit report of FIG. 14.
Figure 18:
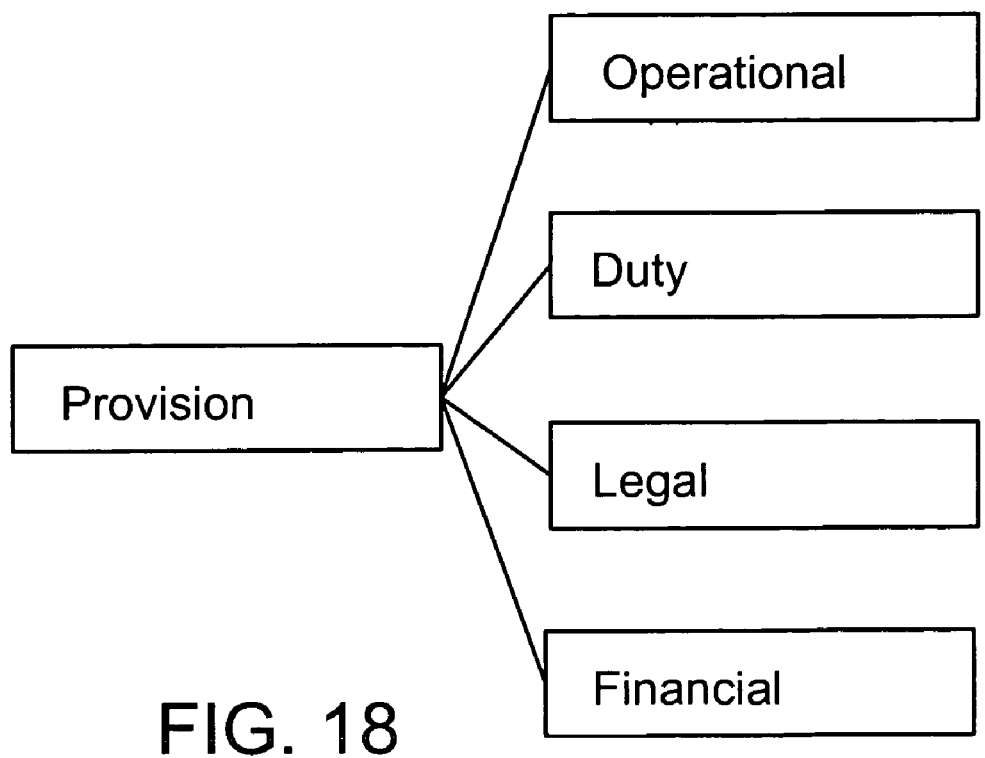
FIG. 18 is block diagram of the DTD for the provision part of the audit report of FIG. 14.
Figure 19:
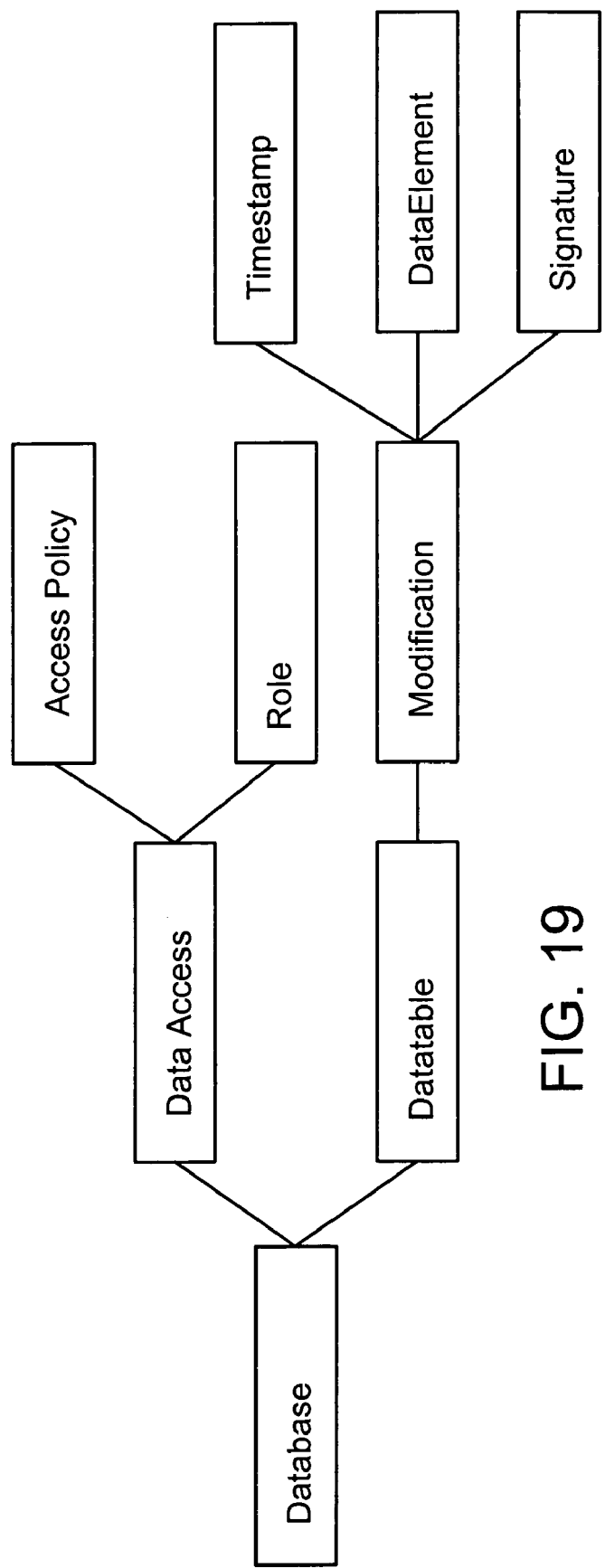
FIG. 19 is a block diagram of the DTD for the data part of the audit report of FIG. 14.

FIG. 14 shows the basic components of the format for the XML audit report. Audit report may be for more than one audit environment. Each audit environment is defined by the following attributes, which are in turn defined by parameters shown in FIGS. 15-19, as follows:

(1) Applications (See FIGS. 15 and 16);

(2) Procedures (or policies—functional checklist) (See FIG. 17);

(3) Provisions (or non-functional checklist) (see FIG. 18); and (4) Data (FIG. 19).

Each of these four attributes is developed as follows. As shown in FIG. 15, the application is specified or defined by its owner, session, host, vendor and database access. The owner is the company or individual with legal rights to the software and its administration. The session is defined as a distinguishable period of activity, transactions, and data exchange. The session is defined by its identifier and transaction. As shown in FIG. 16, a session is defined by one or more transactions. Each transaction resulted in a series of messages and orders, and therefore required a particular protection-profile associated with those messages and orders. An audit trail of messages is provided, including their origins, targets, routes and timestamps. There also need to be a confirmation. The order that formed part of the transaction, e.g., in a supply chain model, is specified by its delivery and invoice. Delivery defines the parties involved, while the invoice is the confirmation of the order. In this way the financial transaction itself is recorded for audit. the protection-profile defines how the transaction's security goals were obtained and enforced.

As shown in FIG. 17, the procedure part of the audit XML is defined by encoding of the procedure rules which may be used for creating a checklist of an audit environment's administrative functions. The audit framework may be used to report on how these procedures were carried out and how regularly.

The provisions part of the audit XML, as shown in FIG. 18, provides a checklist of non-functional or indirect systems processes in the audit environment. These processes include:

(1) operational: training, user manual availability;

(2) duty: relevant roles and responsibilities;

(3) legal: legal constraints on systems; and (4) financial: financial constraints on systems.

Finally, the database part of the audit XML definition is laid out in FIG. 19, and comprises two components: data access and data table. Data access is defined by policies and roles associated with the database that the audit environment is associated with. The parameter data table includes the recordings of data modification grouped per data table, time stamped and verified with signatures.

An example of the encoding of an XML DTD for the audit report is provided below.

```
<!ENTITY % name ""> <!ENTITY % version ""> <!ENTITY %
identifier ""> <!ENTITY % unnamed "">
<!ENTITY % value ""> <!ENTITY % datatype ""> <!ENTITY %
data_range ""> <!ENTITY % organization ""> <!ENTITY % type "">
<!ELEMENT AuditEnvironment (#PCDATA | Application, Procedure,
Provision, DataBase )*>
<!ATTLIST AuditEnvironment %organization; >
<!ELEMENT AuditReport (#PCDATA | AuditEnvironment )*>
<!ATTLIST AuditReport %name; >
<!ELEMENT Application (#PCDATA | Owner, Session, Host, Vendor,
DataBaseAccess )*>
<!ATTLIST Application %version;
                      %name; >
<!ELEMENT User (#PCDATA | Identifier, Role, Status )*>
<!ELEMENT Transaction (#PCDATA | Client, Server, Message,
Order, Protection-Profile, Validity )*>
<!--#USAGE:Timestamp is time of message generation-->
<!ELEMENT Message (#PCDATA | Origin, Target, Route, Timestamp
)*>
<!ELEMENT Client (#PCDATA | Host )*>
<!ELEMENT Host (#PCDATA | Identifier, SystemSpecification,
Location, Vendor )*>
<!ELEMENT Location (#PCDATA | CompanyName, Street, City,
Postcode, Country )*>
<!ELEMENT SystemSpecification (#PCDATA | MediaIdentifier,
Performance, NetworkInterface )*>
<!ELEMENT Vendor (#PCDATA | Identifier )*>
```

A number of embodiments of features of the invention have been described. Nevertheless, it will be understood that various modifications may be made without departing from the spirit and scope of the invention. For example, other document types besides XML can be employed. The transfer of audit data to the warehouse can be administered by and done under the control of a central agency, if desired in a particular setting. While the examples show communication over the Internet via htttp, other communication media, networks and protocols, e.g., SOAP, are embraced by the basic concept. Accordingly, other embodiments are within the scope of the following claims.

What is claimed is:

1. An auditing method for capturing audit data from various applications in collaborative business processes spanning several enterprises not under common control such as sharing the same network or security regime, comprising
    establishing a central audit warehouse as a repository for audit data from the various applications associated with respective business processes comprising one or more commercial transactions each composed of a series of interrelated components created on applications in two or more of said independent enterprises, the corresponding audit data making up an audit trail for a series of events that transpired to carry out a given commercial transaction,
    predefining a standardized format and communication protocol for communicating audit data of various types associated with an application to the audit warehouse,
    extracting audit data at the application level in a native format different from said standardized format;
    converting the audit data in said native format to the corresponding standardized format for the type of audit data,
    transferring the audit data in the standardized format via an interface to the audit warehouse using the predefined communication protocol,
    sorting standardized audit data by the individual commercial transaction to which the audit data relates; and
    storing the sorted audit data at the audit warehouse according to the respective commercial transaction to which the audit data relates so that audit data relating to a given commercial transaction can subsequently be retrieved together to check for compliance with required procedures.

2. The method of claim 1, wherein the single predefined format is in the form of an open standard document type.

3. The method of claim 2 wherein said document type is an XML compliant document.

4. The method of claim 1 wherein the step of transferring said audit data to said warehouse is accomplished via the Internet.

5. The method of claim 4, wherein said document type is an XML compliant document.

6. The method of claim 1, wherein the step of extracting said audit data is accomplished by creating said audit data within the application itself in a format native to the application.

7. The method of claim 1, wherein the step of extracting said audit data is accomplished by obtaining audit data from the application via a collection interface associated with the application, but different from the interface for the warehouse.

8. The method of claim 1, wherein the step of transferring the audit data form the various applications is carried out by pushing data from the applications automatically to the warehouse.

9. The method of claim 3, wherein the step of transferring the audit data from the various applications is carried out by the audit warehouse automatically pulling data from the applications to the warehouse.

10. The method of claim 4, wherein the step of transferring the audit data from the various applications is carried out by ad hoc inquiries to the applications whereupon the requested audit data is sent to the warehouse.

11. The method of claim 5 wherein the ad hoc inquiries to the applications are initiated by an administrator of one of the various applications.

12. The method of claim 1, wherein the step of storing is carried out by associating selected audit data from various applications corresponding to sub-process steps of the commercial transaction.

13. The method of claim 1, further comprising providing at least one output interface from the warehouse.

14. The method of claim 13, wherein said output interface permits multiple participants in said collaborative business processes to query audit data in the warehouse.

15. The method of claim 1, further comprising providing an internal analysis interface for issuing runtime alerts for noncompliant audit data in the warehouse.

16. The method of claim 1, further comprising providing an interface for an external audit analyzer.

17. The method of claim 16, wherein said interface for an external audit analyzer issues audit reports in the form of XML compliant documents according to a prescribed DTD.

18. The method of claim 16, further comprising also providing an internal analysis interface for issuing runtime alerts for noncompliant audit data in the warehouse.

19. The method of claim 18, wherein the interface for issuing runtime alerts offers more restricted access than the interface for external audit.

20. An auditing method for capturing audit data from various applications in collaborative business processes spanning several enterprises not under common control such as sharing the same network or security regime, comprising
    establishing a first central audit warehouse, under the control of one enterprise or of one group of interrelated enterprises as a repository for audit data from the various applications both within the one enterprise or one group of interrelated enterprises and also in distinct enterprises associated with one or more respective business processes, each comprising one or more distinct individual commercial transactions composed of a series of interrelated components created on applications in two or more of said enterprises, the corresponding audit data together making up an audit trail for a series of events that transpired to carry out a given commercial transaction
    transferring audit data to the first warehouse from an application in a distinct enterprise, which has more limited access to data in the first warehouse than the one enterprise or one group of related enterprises, in a standardized format via an interface to the first audit warehouse using a predefined communication protocol, and
    sorting standardized audit data by the commercial transaction to which the audit data relates; and
    storing the sorted audit data at the audit warehouse according to the respective commercial transactions to which the audit data relates so that audit data relating to a given commercial transaction can subsequently be retrieved together to check for compliance with required procedures.

21. The method of claim 20 further comprising
    transferring audit data to the first warehouse from at least one application in the same enterprise or group of enterprises that controls said warehouse, and in the first warehouse, storing in association with each other the data from various applications in the distinct enterprises that relate to a given commercial transaction.

22. The method of claim 20, wherein said interface between the first warehouse and an application in an enterprise that has more limited access to data in the warehouse is a restricted interface to avoid compromising secure data of the controlling enterprise.

23. The method of claim 20 further comprising
establishing a second central audit warehouse, under control of another distinct enterprise or of other groups of interrelated enterprises, as a repository for audit data from the various applications associated with the same given commercial transaction,
transferring audit data to the second warehouse from an application in a distinct enterprise, which has more limited access to data in the second warehouse than said other distinct enterprise or other group of related enterprises, in a standardized format via an interface to the audit warehouse using the a predefined communication protocol, and
sorting standardized audit data at the second warehouse by the commercial transaction to which the audit data relates; and
storing the sorted audit data at the second audit warehouse according to the respective commercial transactions to which the audit data relates so that audit data relating to a given commercial transaction can be retrieved together from the second warehouse to check for compliance with required procedures.

24. The method of claim 23, wherein said interface between the first or second warehouse and an application in an enterprise that has more limited access to data in-the warehouse is restricted so as to limit access to secure data while the interface between the first or second warehouse and an application in an enterprise that controls the warehouse is not so restricted.

* * * * *